United States Patent
Milleman

(10) Patent No.: US 12,458,854 B2
(45) Date of Patent: *Nov. 4, 2025

(54) MULTI-COMPONENT GOLF CLUB HEAD WITH TUNING ELEMENT

(71) Applicant: KARSTEN MANUFACTURING CORPORATION, Phoenix, AZ (US)

(72) Inventor: Travis D. Milleman, Cave Creek, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,040

(22) Filed: Mar. 12, 2024

(65) Prior Publication Data

US 2024/0216770 A1 Jul. 4, 2024

Related U.S. Application Data

(63) Continuation of application No. 17/485,049, filed on Sep. 24, 2021, now Pat. No. 11,925,844.

(Continued)

(51) Int. Cl.
| | |
|---|---|
| A63B 53/04 | (2015.01) |
| A63B 60/00 | (2015.01) |
| A63B 60/54 | (2015.01) |
| B32B 5/02 | (2006.01) |
| B32B 7/12 | (2006.01) |

(Continued)

(52) U.S. Cl.
CPC .......... *A63B 60/54* (2015.10); *A63B 53/0412* (2020.08); *A63B 53/0437* (2020.08); *A63B 53/0466* (2013.01); *A63B 60/002* (2020.08); *B32B 5/02* (2013.01); *B32B 7/12* (2013.01); *B32B 27/12* (2013.01); *A63B 2053/0491* (2013.01); *A63B 53/08* (2013.01); *A63B 2209/00* (2013.01); *B32B 2262/101* (2013.01);

(Continued)

(58) Field of Classification Search
CPC . A63B 60/54; A63B 53/0437; A63B 53/0466; A63B 60/002; A63B 2053/0491
See application file for complete search history.

(56) References Cited

U.S. PATENT DOCUMENTS

| | | |
|---|---|---|
| 5,106,086 A | 4/1992 | Acosta |
| 5,141,230 A | 8/1992 | Antonious |

(Continued)

FOREIGN PATENT DOCUMENTS

| | | |
|---|---|---|
| JP | 3612435 | 1/2005 |
| JP | 2007167622 | 7/2007 |
| JP | 2010240115 | 10/2010 |

OTHER PUBLICATIONS

International Search Report/Written Opinion for Int'l Patent Application No. PCT/US2021/71594, filed on Dec. 22, 2021.

*Primary Examiner* — William M Pierce

(57) ABSTRACT

Embodiments of a multi-material wood-type golf club head comprising a tuning element to damp dominant vibrations are described herein. The multi-material wood-type club head comprises a first, metallic component forming the striking face, and portions of the crown, the heel, the toe, and sole, and a second, non-metallic component forming a majority of the crown and portions of the heel, toe, and sole. The club head further comprises a tuning element secured to the interior surface of the crown, wherein the tuning element damps the amplitude vibration at a vibration hotspot in the club head by between 1-7 decibels.

20 Claims, 10 Drawing Sheets

Related U.S. Application Data

(60) Provisional application No. 63/127,869, filed on Dec. 18, 2020, provisional application No. 63/082,925, filed on Sep. 24, 2020.

(51) Int. Cl.
    *B32B 27/12*     (2006.01)
    *A63B 53/08*     (2015.01)

(52) U.S. Cl.
    CPC ....... *B32B 2274/00* (2013.01); *B32B 2307/10* (2013.01); *B32B 2307/54* (2013.01)

(56) References Cited

U.S. PATENT DOCUMENTS

| | | |
|---|---|---|
| 5,411,255 A | 5/1995 | Kurashima |
| 5,419,559 A | 5/1995 | Melanson |
| 6,074,308 A | 6/2000 | Domas |
| 6,575,845 B2 | 6/2003 | Galloway |
| 6,739,983 B2 | 5/2004 | Helmstetter |
| 6,872,152 B2 | 3/2005 | Beach |
| 6,945,877 B2 | 9/2005 | Kobayashi |
| 7,147,576 B2 | 12/2006 | Imamoto |
| 7,455,600 B2 | 11/2008 | Imamoto |
| 7,530,901 B2 | 5/2009 | Imamoto |
| 7,530,903 B2 | 5/2009 | Imamoto |
| 7,749,104 B2 | 7/2010 | Brekke |
| 7,775,904 B2 | 8/2010 | Hirano |
| 7,803,067 B2 | 9/2010 | Horacek |
| 7,850,545 B2 | 12/2010 | Wada |
| 7,887,435 B2 | 2/2011 | Nishitani |
| 7,914,393 B2 | 3/2011 | Hirsch |
| 7,959,522 B2 | 6/2011 | North, III |
| 7,998,000 B2 | 8/2011 | Brekke |
| 8,007,369 B2 | 8/2011 | Soracco |
| 8,109,842 B2 | 2/2012 | Matsunaga |
| 8,126,687 B2 | 2/2012 | Matsunaga |
| 8,353,783 B2 | 1/2013 | Soracco |
| 8,357,056 B2 | 1/2013 | Horacek |
| 8,585,514 B2 | 11/2013 | Boyd |
| 8,651,975 B2 | 2/2014 | Soracco |
| 8,747,251 B2 | 6/2014 | Hayase |
| 8,827,837 B2 | 9/2014 | Hayase |
| 8,864,604 B2 | 10/2014 | Matsunaga |
| 8,926,450 B2 | 1/2015 | Takahashi |
| 8,961,335 B2 | 2/2015 | Sugimoto |
| 8,986,133 B2 | 3/2015 | Bennett |
| 9,011,980 B1 | 4/2015 | Beaulieu |
| 9,174,103 B2 | 11/2015 | Curtis |
| 9,421,434 B2 | 8/2016 | Takagi |
| 10,086,239 B2 | 10/2018 | Myrhum |
| 10,099,093 B2 | 10/2018 | Parsons |
| 10,596,427 B2 | 3/2020 | Jertson |
| 10,828,542 B2 | 11/2020 | Motokawa |
| 11,235,215 B2 | 2/2022 | Spackman |
| 11,779,819 B2 | 10/2023 | Schweigert |
| 2005/0200059 A1 | 9/2005 | Smith |
| 2007/0149313 A1 | 6/2007 | Matsunaga |
| 2008/0139339 A1 | 6/2008 | Cheng |
| 2011/0183776 A1 | 7/2011 | Breier |
| 2014/0339037 A1 | 11/2014 | Kawaguchi |
| 2022/0088450 A1 | 3/2022 | Milleman |
| 2022/0126175 A1 | 4/2022 | Sugimae |
| 2022/0126176 A1 | 4/2022 | Sugimae |
| 2022/0249928 A1 | 8/2022 | Condez, Jr. |
| 2023/0027166 A1 | 1/2023 | Milleman |

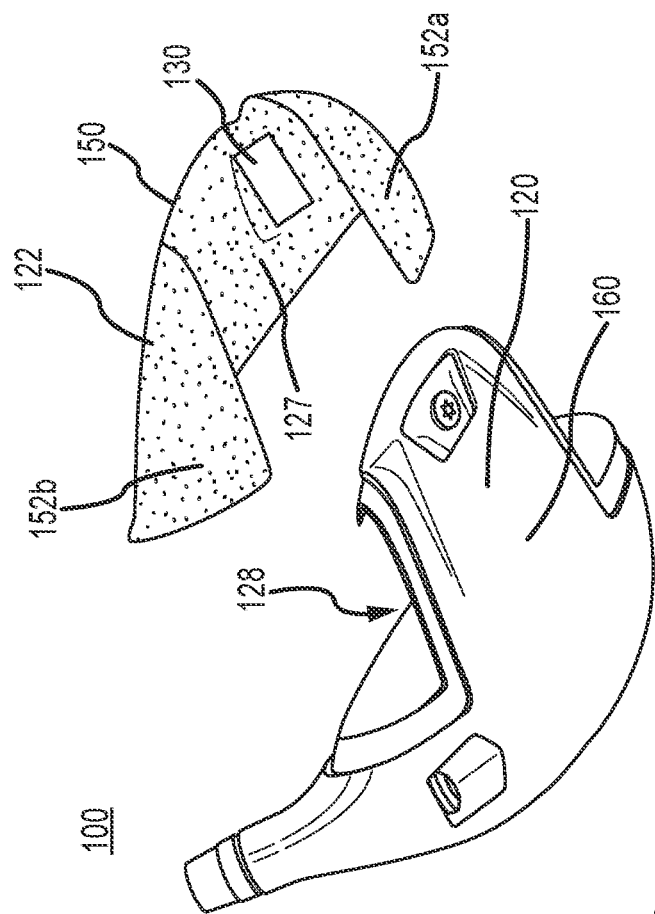
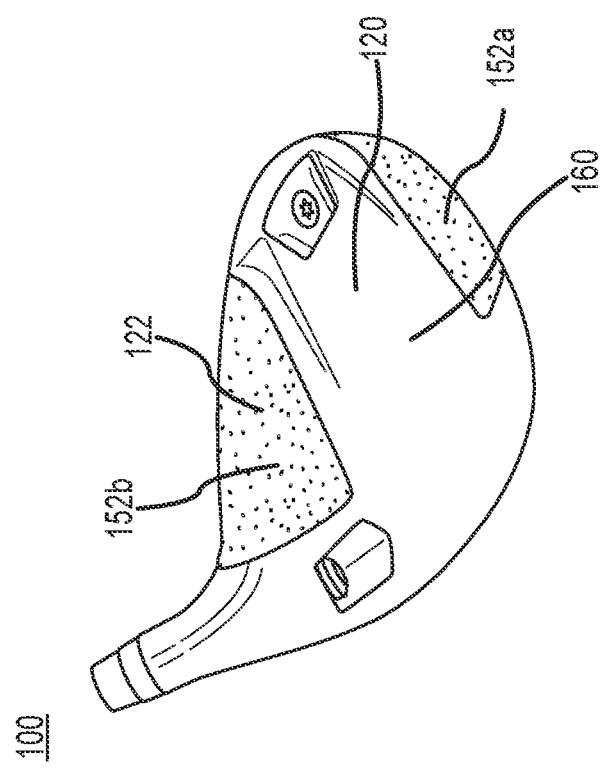
FIG. 4B
FIG. 4A

MULTI-COMPONENT GOLF CLUB HEAD WITH TUNING ELEMENT

CROSS REFERENCE TO RELATED APPLICATIONS

This is a continuation of U.S. patent application Ser. No. 17/485,049, filed on Sep. 24, 2021, now U.S. Pat. No. 11,925,844, issued Mar. 12, 2024, which claims the benefit of U.S. Provisional Patent Application No. 63/127,869, filed on Dec. 18, 2020, and U.S. Provisional Patent Application No. 63/082,925, filed on Sep. 24, 2020. The contents of all the above-described disclosures are incorporated fully herein by reference in their entirely.

FIELD

This invention generally relates to golf equipment, and more particularly, to multi-component golf club heads comprising tuning elements.

BACKGROUND

Golf club design takes into account several performance characteristics, such as vibration and acoustic response. The vibration or acoustic response corresponds to the sound and feel of the golf club. At impact, the club head vibrates at a variety of natural frequencies (also known as "modes" of vibration) comprising a variety of different amplitudes. The club head design and construction determine the variety of different amplitudes that occur at the variety of natural frequencies. Natural frequencies with high amplitudes are considered "dominant" and contribute most significantly to the sound of the club head. If the amplitude of the dominant frequencies is too high, the club head can sound loud and displeasing to the golfer. To provide a more acoustically pleasing response at impact, the dominant vibrations must be damped (i.e. the amplitude of such vibrations must be reduced). However, the means of damping vibrations often requires adding a significant amount of mass to the club head in places that have a negative impact on mass properties such as the center of gravity (CG) position and moment of inertia (MOI). Therefore, there is a need in the art for a lightweight means to damp dominant vibrations in a golf club head, and provide a desirable vibrational response without negatively affecting the mass properties of the club head.

BRIEF DESCRIPTION OF THE DRAWINGS

FIG. 4A illustrates the club head of FIG. 1 comprising a metallic first component, a non-metallic second component, and the tuning element.

FIG. 4B illustrates an exploded view of the club head of FIG. 1 comprising the metallic first component, the non-metallic second component, and the tuning element.

DETAILED DESCRIPTION

Figure 1:
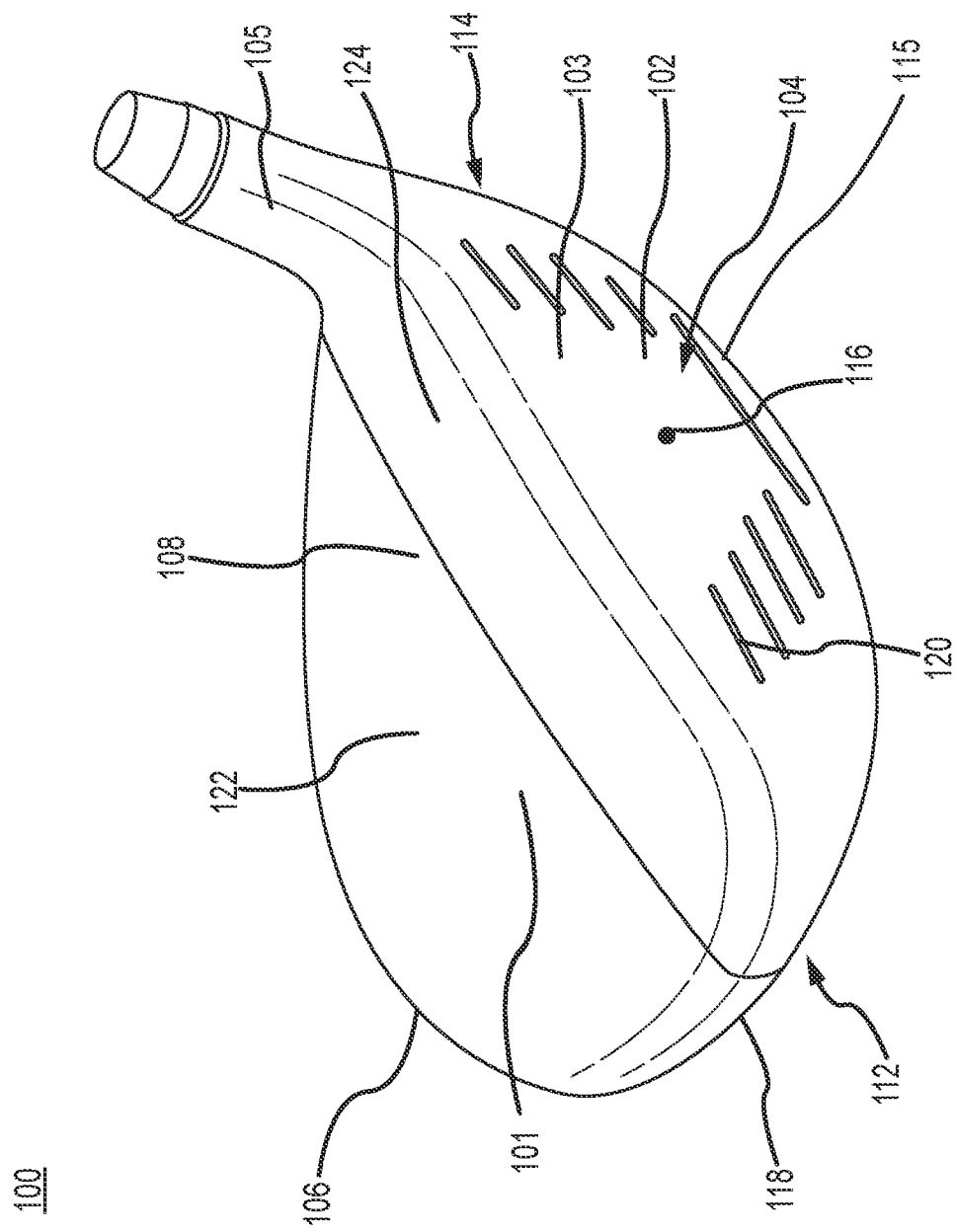
FIG. 1 illustrates a top perspective view of a wood-type golf club head comprising a tuning element.

The present embodiments are directed to wood-type club heads (e.g. drivers, fairway woods or hybrids) with multi-material constructions including lightweight crown tuning elements. When the club head experiences a golf ball impact, the tuning element damps or decreases high amplitudes that occur at a natural frequency, providing an improved acoustic response and a desirable "softer" feel. The tuning element is precisely positioned in a location corresponding to a high amplitude that occurs at a natural frequency. The tuning element improves the acoustic response of the club head without adding a significant amount of mass to the club head. The crown tuning element is a lightweight element or low mass element that improves the club head sound and feel during golf ball impacts; while keeping the overall club head design to retain desirable mass properties such as a maximized club head moment of inertia, and low and back center of gravity position.

The tuning element and tuning element location as described in this disclosure are beneficial for composite club head constructions due to precise placement on the crown before the club head assembly. Further, the tuning element does not lose structural integrity due to heat sources used during the club head assembly process. For example, for club heads comprising a metal component and a composite component, the tuning element is positioned on the composite component before the club head is assembled. Typically, with multi-component club head constructions, the composite component is secured to the metal component via adhesives or mechanical means without using a heat source. The composite assembly process is devoid of heat sources thereby maintaining the structural integrity of the tuning element. In contrast, all metal club heads are casted as a single body, where a faceplate is welded onto the body. Welding the faceplate requires a heat source that affects the structural integrity (e.g. melts) any tuning elements disposed within the interior cavity of the metal club head. The tuning element as described in this disclosure is precisely located on the crown without losing structural integrity or altering material properties.

For example, the club head comprises a two-component design having a first component formed from a metallic material, and a second component formed from a non-metallic material. The first component comprises the load bearing structure and the majority of the club head mass. The first component comprises a rearwardly extending sole portion or sole rear extension that extends away from a striking face. The first component having the sole extension receives removable weights for weight adjustment and can include structures such as ribs to structurally reinforce the club head. The second component comprises a lightweight composite structure that wraps around the first component to form a majority portion of a crown, and portions of a heel, a toe, and a sole of the club head.

The tuning element addresses high amplitudes that occur at dominant natural frequencies. High amplitudes occurring at dominant natural frequencies appear on the non-metal or composite component of the club head. For example, dominant natural frequencies appear on the structural weakest portions of the composite component. Structural weak portions can include portions on the composite component that are thin or comprise a minimum thickness. The thinned portions of the composite component comprise high amplitudes at the dominant natural frequencies.

The tuning element is positioned on the crown portion of the second component to provide sound control. Specifically, the tuning element is positioned on a rear heel portion of the crown to damp the amplitude that occurs at the dominant natural frequency. The tuning element addresses high amplitudes that occur at dominant natural frequencies greater than 5000 Hz. The club head comprising the multi-material construction and the crown tuning element reduces the amplitude of dominant frequencies by 1 to 7 decibels when compared to a similar multi-component club head devoid of the tuning element. The club head comprising the crown tuning element provides superior sound control while minimizing the affect on center of gravity and moment of inertia properties. Described below are a few embodiments of crown tuning elements that improve the acoustic response for multi-component club heads during golf ball impacts.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The terms "first," "second," "third," "fourth," "fifth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein. In the interest of consistency and clarity, all directional references used herein assume that the referenced golf club head is resting on a horizontally flat ground plane such that predefined loft and lie angles for the club head are achieved. The "front" or "forward portion" of the golf club head generally refers to the side of the golf club head (when viewed normal to the ground plane) that includes the golf club head strikeface. Conversely, the rear portion of the club head is opposite the strikeface and can include anything behind the strikeface and/or portions of the club head that are trailing the strike face at impact.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

The terms "loft" or "loft angle" of a golf club, as described herein, refers to the angle formed between the club face and the shaft, as measured by any suitable loft and lie machine.

"Driver golf club heads" as used herein comprise a loft angle less than approximately 16 degrees, less than approximately 15 degrees, less than approximately 14 degrees, less than approximately 13 degrees, less than approximately 12 degrees, less than approximately 11 degrees, or less than approximately 10 degrees. Further, in many embodiments, "driver golf club heads" as used herein comprise a volume greater than approximately 400 cc, greater than approximately 425 cc, greater than approximately 445 cc, greater than approximately 450 cc, greater than approximately 455 cc, greater than approximately 460 cc, greater than approximately 475 cc, greater than approximately 500 cc, greater than approximately 525 cc, greater than approximately 550 cc, greater than approximately 575 cc, greater than approximately 600 cc, greater than approximately 625 cc, greater than approximately 650 cc, greater than approximately 675 cc, or greater than approximately 700 cc. In some embodiments, the volume of the driver can be approximately 400 cc-600 cc, 425 cc-500 cc, approximately 500 cc-600 cc, approximately 500 cc-650 cc, approximately 550 cc-700 cc, approximately 600 cc-650 cc, approximately 600 cc-700 cc, or approximately 600 cc-800 cc.

"Fairway wood golf club heads" as used herein comprise a loft angle less than approximately 35 degrees, less than approximately 34 degrees, less than approximately 33 degrees, less than approximately 32 degrees, less than approximately 31 degrees, or less than approximately 30 degrees. Further, in some embodiments, the loft angle of the fairway wood club heads can be greater than approximately 12 degrees, greater than approximately 13 degrees, greater than approximately 14 degrees, greater than approximately 15 degrees, greater than approximately 16 degrees, greater than approximately 17 degrees, greater than approximately 18 degrees, greater than approximately 19 degrees, or greater than approximately 20 degrees. For example, in other embodiments, the loft angle of the fairway wood can be between 12 degrees and 35 degrees, between 15 degrees and 35 degrees, between 20 degrees and 35 degrees, or between 12 degrees and 30 degrees.

Further, "fairway wood golf club heads" as used herein comprises a volume less than approximately 400 cc, less than approximately 375 cc, less than approximately 350 cc, less than approximately 325 cc, less than approximately 300 cc, less than approximately 275 cc, less than approximately 250 cc, less than approximately 225 cc, or less than approximately 200 cc. In some embodiments, the volume of the fairway wood can be approximately 150 cc-200 cc, approximately 150 cc-250 cc, approximately 150 cc-300 cc, approximately 150 cc-350 cc, approximately 150 cc-400 cc, approximately 300 cc-400 cc, approximately 325 cc-400 cc, approximately 350 cc-400 cc, approximately 250 cc-400 cc, approximately 250-350 cc, or approximately 275-375 cc.

"Hybrid golf club heads" as used herein comprise a loft angle less than approximately 40 degrees, less than approximately 39 degrees, less than approximately 38 degrees, less than approximately 37 degrees, less than approximately 36 degrees, less than approximately 35 degrees, less than approximately 34 degrees, less than approximately 33 degrees, less than approximately 32 degrees, less than approximately 31 degrees, or less than approximately 30 degrees. Further, in many embodiments, the loft angle of the hybrid can be greater than approximately 16 degrees, greater than approximately 17 degrees, greater than approximately 18 degrees, greater than approximately 19 degrees, greater than approximately 20 degrees, greater than approximately 21 degrees, greater than approximately 22 degrees, greater than approximately 23 degrees, greater than approximately 24 degrees, or greater than approximately 25 degrees.

Further, "hybrid golf club heads" as used herein comprise a volume less than approximately 200 cc, less than approximately 175 cc, less than approximately 150 cc, less than approximately 125 cc, less than approximately 100 cc, or less than approximately 75 cc. In some embodiments, the volume of the hybrid can be approximately 100 cc-150 cc, approximately 75 cc-150 cc, approximately 100 cc-125 cc, or approximately 75 cc-125 cc.

The term "decibel" or "decibels" as used herein refer to units of vibrational amplitude. Decibels of vibration are measured on a logarithmic scale. Due to the logarithmic nature of the decibel scale, a linear increase in a decibel value of amplitude correlates to an exponential increase in vibrational amplitude (or "vibrational energy"), as measured by a linear scale. As such, a decrease and/or increase in the decibel value of a vibrational amplitude, even by 1 or 2 decibels correlates to a significant decrease and/or increase in the magnitude of the vibrational amplitude.

Other features and aspects will become apparent by consideration of the following detailed description and accompanying drawings. Before any embodiments of the disclosure are explained in detail, it should be understood that the disclosure is not limited in its application to the details or embodiment and the arrangement of components as set forth in the following description or as illustrated in the drawings. The disclosure is capable of supporting other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

General Description of a Multi-Component Club Head

Before discussion of the tuning element structure and its advantageous benefits of damping high amplitudes at dominant natural frequencies, described below is an embodiment of a multi-component or composite club head construction. Referring to the drawings, wherein like reference numerals are used to identify like or identical components in various views, FIGS. 1-9 schematically illustrate a multi-material wood-type golf club head in various views. The club head 100 comprises a first component 120 and a second component 122 that are secured together to define a substantially closed/hollow interior volume. The club head 100 comprises a strike face 102, a front end 104, a rear end 106 opposite the front end 104, a crown 108, a sole 110 opposite the crown 108, a heel end 114, and a toe end 112 opposite the heel end 114. The front end 104 of the club head 100 comprises the strike face 102 and a leading edge 115. The club head 100 further comprises a skirt or trailing edge 118 located between and adjoining the crown and the sole, the skirt extending from near the heel end 114 to near the toe end 112 of the club head 100.

The club head 100 is a wood-type club head such as a driver, fairway wood, or hybrid as described in this disclosure. The strike face 102 and the body 101 can define an internal cavity of the club head 100. The body 104 can extend over the crown 108, the sole 110, the heel end 114, the toe end 112, the rear 106, and a perimeter of the front end 104. In these embodiments, the body 101 defines an opening on the front end 104 of the club head 100 and the strike face 102 is positioned within the opening to form the club head 100. In other embodiments, the strike face 102 extends over the perimeter of the front end 104 and can include a strike face return portion extending over at least one of the crown 108, the sole 110, the heel 112, and the toe 114 (not shown). In embodiments comprising the strike face return, the return portion of the strike face 102 is secured to the body 101 to form the club head 100. In these embodiments, the club head 100 can resemble a cup face or face wrap design.

Figure 2:
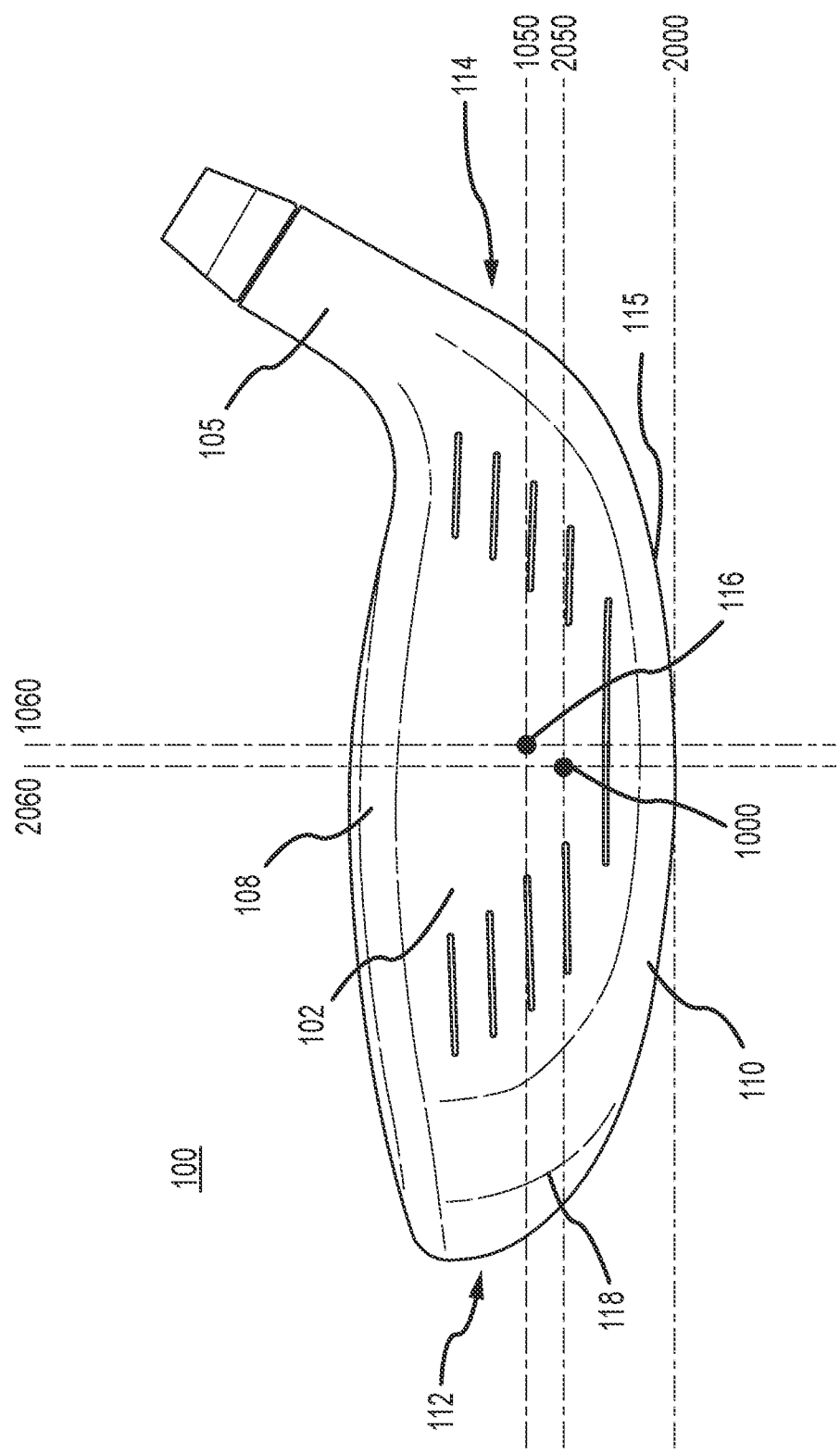
FIG. 2 illustrates a front view of the club head of FIG. 1.
Figure 3:
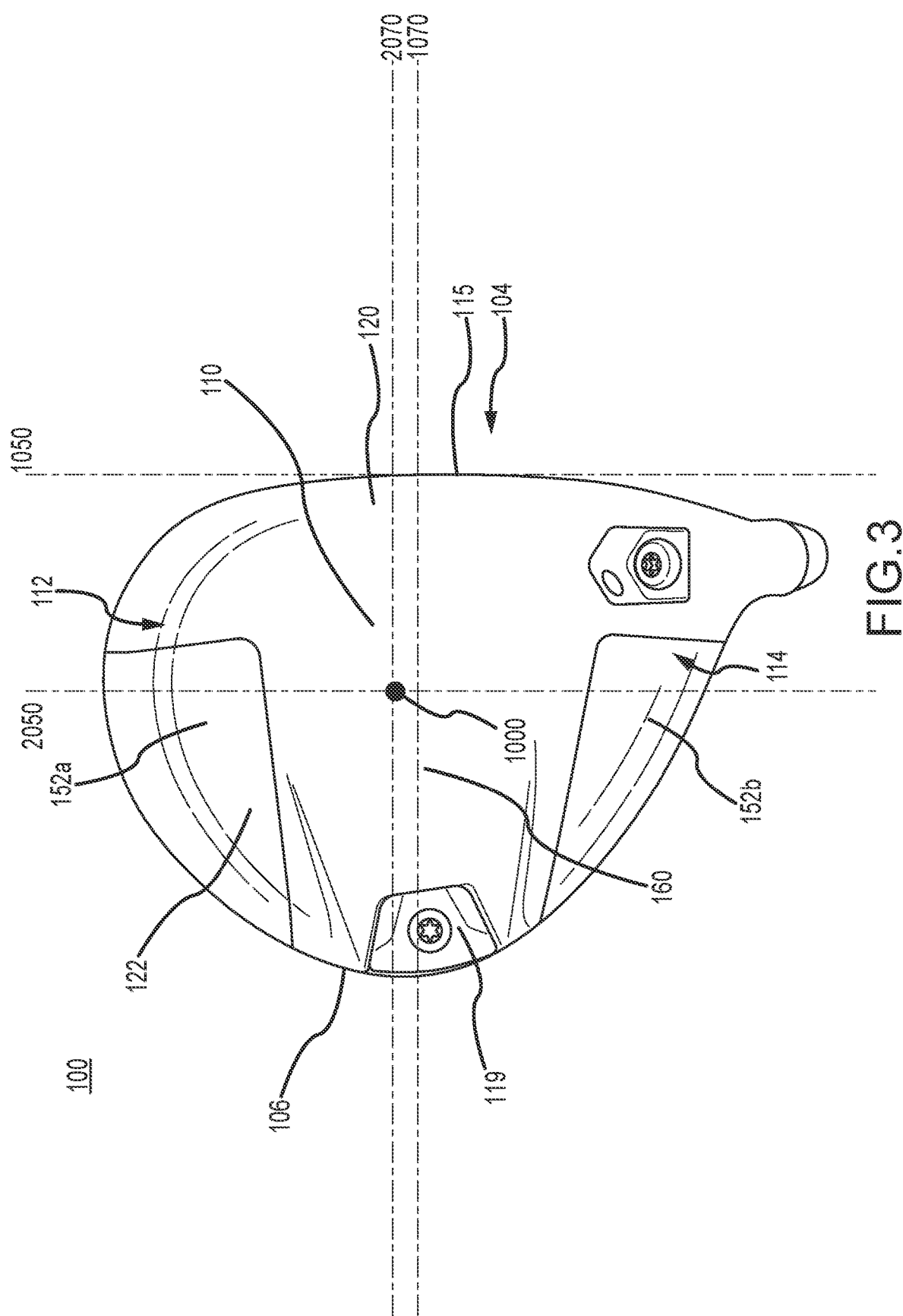
FIG. 3 illustrates a sole view of the club head of FIG. 1.

As illustrated in FIGS. 1-3, the club head 100 comprises a hosel structure 105. The hosel structure 105 is capable of receiving a hosel sleeve and a golf shaft, wherein the hosel sleeve can be coupled to an end of the golf shaft (not shown). The hosel sleeve can be coupled with the hosel structure in a plurality of configurations, thereby permitting the golf shaft to be secured to the hosel structure at a plurality of angles.

The club head 100 can further comprise a weight port 119 configured to receive a removable weight. In many embodiments, the weight port 119 can be located in the sole 110 and/or in the skirt 118. The removable weight can adjust the moment of inertia (MOI) properties and center of gravity (CG) location.

The strike face 102 comprises a striking surface 103 intended to impact a golf ball. The striking surface 103 further defines a face center or geometric center 116. In some embodiments, the face center 116 can be located at a geometric center point of the striking surface 103. In another approach, the face center 116 of the striking surface 1030 can be located in accordance with the definition of a golf governing body such as the United States Golf Association (USGA).

Referring to FIGS. 1-3, the club head 100 defines a ground plane 2000 tangent to the sole 110 when the club head 100 is at an address position. The face center 116 of the striking surface 103 defines an origin for a coordinate system having an x-axis 1050, a y-axis 1060, and a z-axis 1070. The x-axis 1050 is a horizontal axis that extends through the face center 116 in a direction extending from near the heel end 114 to near the toe end 112 parallel to the ground plane 2000. The y-axis 1060 is a vertical axis that extends through the face center 116 in a direction extending from near the sole 110 to near the crown 108 perpendicular to the ground plane 2000. The y-axis 1060 is perpendicular to the x-axis 1050. The z-axis 1070 is a horizontal axis that extends through the face center 116 in a direction extending from near the front end 104 to near the rear end 106 parallel to the ground plane 2000. The z-axis 1070 is perpendicular to the x-axis 1050 and the y-axis 1060. The x-axis 1050 extends in a positive direction toward the heel end 114. The y-axis 1060 extends in a positive direction toward the crown 108. The z-axis 1070 extends in a positive direction toward the rear end 106.

Figure 6:
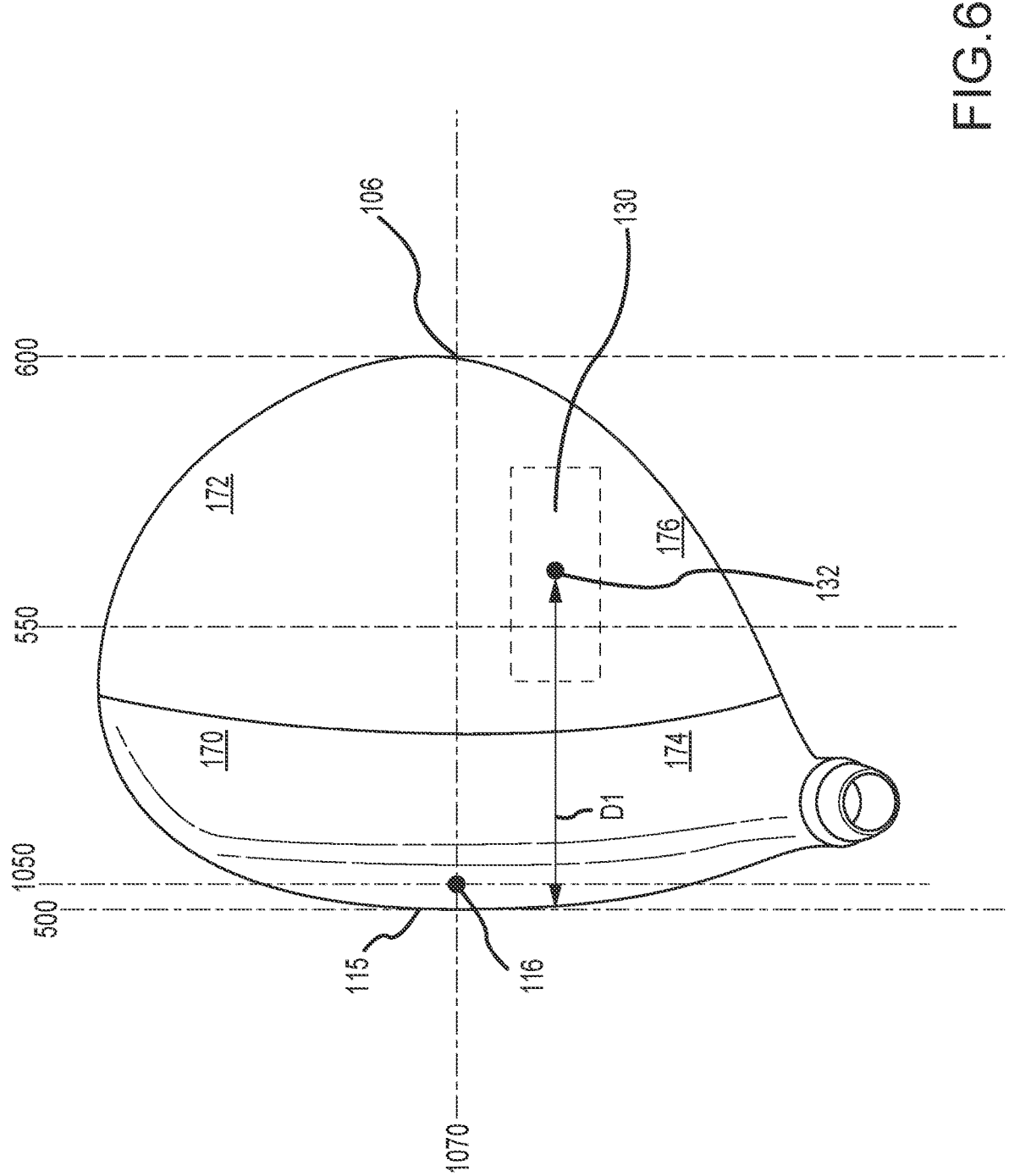
FIG. 6 illustrates a crown view of the club head of FIG. 1 defining a plurality of quadrants.

Referring to FIG. 6, the club head 100 further comprises a plurality of quadrants defined within the coordinate system. The club head 100 defines a front end reference plane 500 tangent to the leading edge 115 and perpendicular to the ground plane 2000 at address. The club head 100 defines a rear end reference plane 600 tangent to the rear end 106 and parallel to the front end reference plane 500. The club head 100 further defines a midplane 550 defined midway between the front end reference plane 500 and the rear end reference plane 600, the midplane 550 extending parallel to both the front end reference plane 500 and the rear end reference plane 600. From a top or crown view, as illustrated by FIG. 6, the club head 100 defines a plurality of quadrants divided by the midplane 550 and a YZ plane, the YZ plane defined as a plane extending along the y-axis and the z-axis. The club head 100 defines a front-toe quadrant 170, a rear-toe quadrant 172, a front-heel quadrant 174, and a rear-heel quadrant 176. The front-toe quadrant 170 is located forward the midplane 550 and toe-ward of the YZ plane. The rear-toe quadrant 172 is located rearward of the midplane 550 and toe-ward of the YZ plane. The front-heel quadrant 174 is located forward of the midplane 550 and heel-ward of the YZ plane. The rear-heel quadrant 176 is located rearward of the midplane 550 and heel-ward of the YZ plane.

As illustrated in FIGS. 2 and 3, the club head 100 further comprises a center of gravity (CG) 1000. In many embodiments, the center of gravity 1000 is located within the coordinate system defined above. The center of gravity 1000 comprises a location on the x-axis 1050, the y-axis 1060, and the z-axis 1070. The center of gravity 1000 further defines an origin of coordinate system having a CG x-axis 2050, a CG y-axis 2060, and a CG z-axis 2070. The CG x-axis 2050 extends through the CG 1000 from near the heel end 114 to near the toe end 112. The CG y-axis 2060 extends through the CG 1000 from near the crown 108 to near the sole 110, the CG y-axis 2070 is perpendicular to the CG x-axis 2050. The CG z-axis 2070 extends through the CG 1000 from near the front end 104 to near the rear end 106, perpendicular to both the CG x-axis 2050 and the CG y-axis 2060.

The CG x-axis 2050 is parallel to the x-axis 1050, the CG y-axis 2060 is parallel to the y-axis 1060, and the CG z-axis 2070 is parallel to the z-axis 1070. In many embodiments, the center of gravity 1000 is strategically positioned toward the sole 110 and the rear end 106 of the club head 100.

The club head 100 further comprises a moment of inertia Ixx about the CG x-axis 2050 (i.e. crown-to-sole moment of inertia) and a moment of inertia Iyy about the CG y-axis 2060 (i.e. heel-to-toe moment of inertia). As described in more detail below, the crown-to-sole moment of inertia Ixx and the heel-to-toe moment of inertia Iyy are increased or maximized to provide a high forgiving club head. The club head 100 comprises a high moment of inertia Ixx and a high moment of inertia Iyy. The high moment of inertia Ixx and the high moment of inertia Iyy provide the club head 100 improved feel, forgiveness, and playability.

First Component

As illustrated in FIGS. 1-4, the club head 100 can be formed from multiple materials. The club head 100 comprises the first component 120 formed from a metallic material. The first component 120 comprises the loading bearing structure and the majority of the club head 100 mass to withstand repeated golf ball impacts. The first component 120 is configured to impact golf balls and provide structural reinforcement to the club head 100. The first component 120 comprises the weight port 119 located in the club head rear that receives removable weights for weight adjustment and can include structures such as ribs to structurally reinforce the club head 100.

The first component comprises the front end 104 having the strike face 102, the hosel structure 105, and the return portion 124 extending rearward from a perimeter of the strike face 102. In some embodiments, the first component 102 can be integrally formed as a single structure or component, wherein the first component 102 is formed with a single material. Alternately, the first component 102 can receive a separately formed strike face insert that can be secured to an opening in the front end of the club head 100. The separately formed strike face insert can comprise a metallic material different from the metallic material of the first component.

The return portion 124 of the first component 120 forms a portion of the crown 108, the sole 110, the hosel structure 105, the heel end 114, and the toe end 112. The first component 120 further comprises a sole rear extension 160 that extends rearward the return portion 124. The sole rear extension 160 forms a portion of the sole 110, the sole rear extension 160 extending between the return portion 124 and the rear end 106 of the club head 100. The sole rear extension 160 extends the majority of a club head length, the club head length being measured from the leading edge 115 to the trailing edge 118 parallel to the z-axis 1070. As illustrated in FIGS. 3, 4A, and 4B, the sole rear extension 160 comprises weight port 119 for weight adjustability and/or reinforcing structures to reinforce the club head 100.

The first component 120 of the club head 100 can be formed from, but not limited to, steel, steel alloys, stainless steel alloys, nickel, nickel alloys, cobalt, cobalt alloys, titanium alloys, an amorphous metal alloy, or other similar materials. For example, the first component 120 can be formed from, but not limited to, Ti-8Al-1Mo-1V alloy, 17-4 stainless steel, C300, C350, Ni (Nickel)-Co(Cobalt)-Cr (Chromium)-Steel Alloy, 565 Steel, AISI type 304 or AISI type 630 stainless steel, 17-4 stainless steel, a titanium alloy, for example, but not limited to Ti-6-4, Ti-3-8-6-4-4, Ti-10-2-3, Ti 15-3-3-3, Ti 15-5-3, Ti185, Ti 6-6-2, Ti-7s, Ti-9s, Ti-92, T9s+, or Ti-8-1-1 titanium alloy, an amorphous metal alloy, or other similar metals.

Second Component

The club head 100 further comprises a second component 122 formed from a lightweight, non-metallic material. The second component 122 reduces crown mass and allows for additional discretionary mass to be distributed to the first component 120 and/or removable weights. The second component 122 can be formed by injection molding as a single structure or component having a single material. As described in more detail below, the tuning element is adhered or secured to the second component 122 to damp high amplitudes that occur at dominant natural frequencies.

As illustrated in FIGS. 1-4, the second component 122 forms a majority of the crown 108, and portions of the heel end 114, toe end 112, sole 110, rear end 106, and skirt 118. The second component 122 comprises a crown portion 150, a sole toe portion 152a, and a sole heel portion 152b. The second component 122 is configured to be secured to the first component 120. Referring to FIGS. 4A and 4B, the second component 122 is configured to wrap around the first component, 120 wherein the second component 122 abuts the return portion 124 and the sole rear extension 160 of the first component 120. From a sole view, the first component 120 extends between the second component 122. Specifically, the sole rear extension 160 of the first component 120 extends between the second component 122, wherein the second component 122 forms a heel portion 152b of the sole 110 and a toe portion 152a of the sole 110.

The second component 122 is secured to the first component 120 at a bond surface. The second component 122 can be secured to the first component 120 via adhesives or by mechanical means at the bond surface. The bond surface can be located at a junction between the first component 120 and the second component 122. The bond surface can be a recessed lip, wherein the recessed lip extends along a perimeter of the return portion 124 and the sole rear extension 160. The recessed lip can be recessed from an outer surface of the club head 100 to accommodate the combined thickness of the overlap between the first component 120 and the second component 122, and any adhesives used to secure the two components together.

The second component 122 can be located within the plurality of quadrants described above. As described above, the club head 100 defines the front-toe quadrant 170, the rear-toe quadrant 172, the front-heel quadrant 174, and the rear-heel quadrant 176. A portion of the second component 122 can be located in the front-toe quadrant 170 and the front-heel quadrant 174. The second component 122 can be located entirely in the rear-toe quadrant 172 and the rear-heel quadrant 176. In other words, a majority of the second component 122 (i.e. a surface area of the second component 122) can be located rearward the midplane 550. For example, greater than 50%, 55%, 60%, 65%, 70%, 75%, 80%, 85%, or 90% of the second component 122 surface area can be located rearward the midplane 550. In other embodiments, the second component 122 surface area located rearward the midplane 550 can range from 55 to 95%. In other embodiments still, the second component 122 surface area located rearward the midplane 550 can range from 50% to 70%, 55% to 75%, 60% to 80%, 65% to 85%, 70% to 90%, or 75% to 95%. For example, the second component 122 surface area located rearward the midplane 550 can be 50%, 55%, 60%, 65%, 70%, 75%, 80%, 85%, 90%, or 95%.

The second component 122 comprises a lower density material than the material of the first component 120. In some embodiments, the second component 122 can comprise a composite formed from polymer resin and reinforcing fiber. The polymer resin can comprise a thermoset or a thermoplastic. The second component 122 composite can be either a filled thermoplastic (FT) or a fiber-reinforced composite (FRC). In some embodiments, the second component 122 can comprise a FT bonded together with an FRC. Filled thermoplastics (FT) are typically injection molded into the desired shape. Filled thermoplastics (FT) can comprise a thermoplastic resin and randomly-oriented, non-continuous fibers. In contrast, fiber-reinforced composites (FRCs) are formed from resin-impregnated (prepreg) sheets of continuous fibers. Fiber-reinforced composites (FRCs) can comprise either thermoplastic or thermoset resin.

In embodiments with a thermoplastic resin, the resin can comprise a thermoplastic polyurethane (TPU) or a thermoplastic elastomer (TPE). For example, the resin can comprise polyphenylene sulfide (PPS), polyetheretheretherketone (PEEK), polyimides, polyamides such as PA6 or PA66, polyamide-imides, polyphenylene sulfides (PPS), polycarbonates, engineering polyurethanes, and/or other similar materials. Although strength and weight are the two main properties under consideration for the composite material, a suitable composite material may also exhibit secondary benefits, such as acoustic properties. In some embodiments, PPS and PEEK are desirable because they emit a generally metallic-sounding acoustic response when the club head is impacted.

The reinforcing fiber can comprise carbon fibers (or chopped carbon fibers), glass fibers (or chopped glass fibers), graphite fibers (or chopped graphite fibers), or any other suitable filler material. In other embodiments, the composite material may comprise any reinforcing filler that adds strength, durability, and/or weighting.

The density of the composite material (combined resin and fibers), which forms the second component 122, can range from about 1.15 g/cc to about 2.02 g/cc. In some embodiments, the composite material density ranges between about 1.20 g/cc and about 1.90 g/cc, about 1.25 g/cc and about 1.85 g/cc, about 1.30 g/cc and about 1.80 g/cc, about 1.40 g/cc and about 1.70 g/cc, about 1.30 g/cc and about 1.40 g/cc, or about 1.40 g/cc to about 1.45 g/cc.

Second Component Materials—Filled Thermoplastic (FT)

In a FT material, the polymer resin should preferably incorporate one or more polymers that have sufficiently high material strengths and/or strength/weight ratio properties to withstand typical use while providing a weight savings benefit to the design. Specifically, it is important for the design and materials to efficiently withstand the stresses imparted during an impact between the strike face and a golf ball, while not contributing substantially to the total weight of the golf club head. In general, the polymers can be characterized by a tensile strength at yield of greater than about 60 MPa (neat). When the polymer resin is combined with the reinforcing fiber, the resulting composite material can have a tensile strength at yield of greater than about 110 MPa, greater than about 180 MPa, greater than about 220 MPa, greater than about 260 MPa, greater than about 280 MPa, or greater than about 290 MPa. In some embodiments, suitable composite materials may have a tensile strength at yield of from about 60 MPa to about 350 MPa.

In some embodiments, the reinforcing fiber comprises a plurality of distributed discontinuous fibers (i.e. "chopped fibers"). In some embodiments, the reinforcing fiber comprises a discontinuous "long fibers," having a designed fiber length of from about 3 mm to 25 mm. In some embodiments the discontinuous "long fibers" have a designed fiber length of from about 3 mm to 14 mm. For example, in some embodiments, the fiber length is about 12.7 mm (0.5 inch) prior to the molding process. In another embodiment, the reinforcing fiber comprises discontinuous "short fibers," having a designed fiber length of from about 0.01 mm to 3 mm. In either case (short or long fiber), it should be noted that the given lengths are the pre-mixed lengths, and due to breakage during the molding process, some fibers may actually be shorter than the described range in the final component. In some configurations, the discontinuous chopped fibers may be characterized by an aspect ratio (e.g., length/diameter of the fiber) of greater than about 10, or more preferably greater than about 50, and less than about 1500. Regardless of the specific type of discontinuous chopped fibers used, in certain configurations, the composite material may have a fiber length of from about 0.01 mm to about 25 mm or from about 0.01 mm to about 14 mm.

The composite material may have a polymer resin content of from about 40% to about 90% by weight, or from about 55% to about 70% by weight. The composite material of the second component can have a fiber content between about 10% to about 60% by weight. In some embodiments, the composite material has a fiber content between about 20% to about 50% by weight, between 30% to 40% by weight. In some embodiments, the composite material has a fiber content of between about 10% and about 15%, between about 15% and about 20%, between about 20% and about 25%, between about 25% and about 30%, between about 30% and about 35%, between about 35% and about 40%, between about 40% and about 45%, between about 45% and about 50%, between about 50% and about 55%, or between about 55% and about 60% by weight.

In embodiments where the second component 122 comprises a filled thermoplastic (FT) material, the second component 122 can be injection molded out of composite pellets comprising both the polymer resin and the reinforcing fibers. The reinforcing fibers can be embedded within the resin prior to the injection molding process. The pellets can be melted and injected into an empty mold to form the second component 122. The FT composite material can have a melting temperature of between about 210° C. to about 280° C. In some embodiments, the composite material can have a melting temperature of between about 250° C. and about 270° C.

In embodiments with FT material second components 122, at least 50% of the fibers can be aligned roughly front-to-back in a center region of the crown 110. In other words, the fibers can be aligned roughly perpendicular to the striking face 170. FT materials exhibit greatest strength in the direction of fiber alignment. Therefore, having the fibers oriented approximately oriented in a front-to-rear direction increases the durability of the club head 100. The fibers can be oriented in approximately a front-to-rear direction to address compression stress within the crown 108 that occurs during golf ball impacts. The fiber alignment can correspond to the direction of material flow within the mold during the injection molding process.

In some embodiments, the second component 122 can be formed from a long fiber reinforced TPU material (an example FT material). The long fiber TPU can comprise about 40% long carbon fiber by weight. The long fiber TPU can exhibit a high elastic modulus, greater than that of short carbon fiber compounds. The long fiber TPU can withstand high temperatures, making it suitable for use in a golf club head that is used and/or stored in a hot climate. The long fiber TPU further exhibits a high toughness, allowing it to serve well as a replacement for traditionally metal components. In some embodiments, the long fiber TPU comprises a tensile modulus between about 26,000 MPa and about 30,000 MPa or between about 27,000 MPa and about 29,000 MPa. In some embodiments, the long fiber TPU comprises a flexural modulus between about 21,000 MPa and about 26,000 MPa or between about 22,000 MPa and 25,000 MPa. The long fiber TPU material can exhibit an tensile elongation (at break) of between about 0.5% and about 2.5%. In some embodiments, the tensile elongation of the composite TPU material can be between about 1.0% and about 2.0%, between about 1.2% and about 1.4%, between about 1.4% and about 1.6%, between about 1.6% and about 1.8%, between about 1.8% and about 2.0%.

Second Component Materials—Fiber-Reinforced Composite (FRC)

In some embodiments, the second component 122 may comprise fiber-reinforced composite (FRC) materials. FRC materials generally include one or more layers of a uni- or multi-directional fiber fabric that extend across a larger portion of the polymer. Unlike the reinforcing fibers that may be used in filled thermoplastic (FT) materials, the maximum dimension of fibers used in FRCs may be substantially larger/longer than those used in FT materials, and may have sufficient size and characteristics so they may be provided as a continuous fabric separate from the polymer. When formed with a thermoplastic polymer, even if the polymer is freely flowable when melted, the included continuous fibers are generally not. The reinforcing fibers can comprise an areal weight (weight per length-by-width area) between 75 g/m2 and 150 g/m2.

FRC materials are generally formed by arranging the fiber into a desired arrangement, and then impregnating the fiber material with a sufficient amount of a polymeric material to provide rigidity. In this manner, while FT materials may have a resin content of greater than about 45% by volume or more preferably greater than about 55% by volume, FRC materials desirably have a resin content of less than about 45% by volume, or more preferably less than about 35% by volume. In some embodiments, the resin content of the FRC can be between 24% and 45% by volume.

FRC materials traditionally use two-part thermoset epoxies as the polymeric matrix, however, it is possible to also use thermoplastic polymers as the matrix. In many instances, FRC materials are pre-prepared prior to final manufacturing, and such intermediate material is often referred to as a prepreg. When a thermoset polymer is used, the prepreg is partially cured in intermediate form, and final curing occurs once the prepreg is formed into the final shape. When a thermoplastic polymer is used, the prepreg may include a cooled thermoplastic matrix that can subsequently be heated and molded into a final shape.

An FRC second component 122 can be comprise a plurality of layers (also called a plurality of lamina). Each layer can comprise and/or be the same thickness as a prepreg. Each layer the plurality of layers can comprise either a unidirectional fiber fabric (UD) or a multi-directional fiber fabric (sometimes called a weave). In some embodiments, the plurality of layers can comprise at least three UD layers. The second and third layers can be angled relative to a base layer. For a base layer oriented at 0 degrees, the second and third layers can be oriented at +/−45 degrees from the base layer. In some embodiments, the layers can be oriented at 0, +45, −45, +90, −90 in any suitable order. In some embodiments, the plurality of layers comprises at least one multi-directional weave layer, typically positioned as the top layer to improve the appearance of the FRC second component 122.

Second Component Materials—Mixed-Material

The second component 122 may have a mixed-material construction that includes both a fiber-reinforced composite resilient layer and a molded thermoplastic structural layer. In some preferred embodiments, the molded thermoplastic structural layer may be formed from a filled thermoplastic material (FT). As described above, the FT can comprise a discontinuous glass, carbon, or aramid polymer fiber filler embedded throughout a thermoplastic material. The thermoplastic resin can be a TPU, such as, for example, polyphenylene sulfide (PPS), polyether ether ketone (PEEK), or a polyamide such as PA6 or PA66. The fiber-reinforced composite resilient layer can comprise a woven glass, carbon fiber, or aramid polymer fiber reinforcing layer embedded in a polymeric resin (or matrix). The polymeric resin of the resilient layer can be a thermoplastic or a thermoset.

In some embodiments, the polymeric resin of fiber-reinforced composite resilient layer is the same thermoplastic material as the resin of the molded thermoplastic structural layer. In other words, the fiber-reinforced resilient layer and the molded structural layer can comprise a common thermoplastic resin. Forming the resilient and structural layers with a common thermoplastic resin allows for a strong chemical bond between the layers. In these embodiments, the resilient and structural layers can be bonded without the use of an intermediate adhesive. In one particular embodiment, the second component 122 resilient layer can comprise a woven carbon fiber fabric embedded in a polyphenylene sulfide (PPS), and the second component (122) structural layer can comprise a filled polyphenylene sulfide (PPS) polymer. In alternate embodiments, the second component 122 can be extruded, injection blow molded, 3-D printed, or any other appropriate forming means.

Tuning Element

The multi-material club head 100 described above can further comprise a tuning element 130. Multiple material club heads comprise different sound or acoustic response considerations when compared to the acoustic response of all metal club heads. The tuning element 130 can be located on the lightweight, non-metallic second component 122 to provide a desirable acoustic response and a desirable "softer" feel for the multi-material club head 100.

As described below and with reference to FIGS. 4A-9, the tuning element 130 improves the sound and feel characteristics of the club head 100 by damping dominant vibrations. In some embodiments, the club head 100 comprises a reduction in dominant vibration amplitude by between 1 and 7 decibels in comparison to a similar multi-material club head devoid of a tuning element. The club head 100 comprises superior sound control while minimizing the effect on the club head center of gravity 1000 position and moment of inertia.

The tuning element 130 is disposed at a targeted location to control vibration and sound. The tuning element 130 damps the amplitude of dominant impact vibrations that produce undesirable sound or feel in the club head 100. The tuning element 100 can be located on a portion of the club head 100 that experiences dominant vibrations and can damp such undesirable vibrations. The tuning element 130 serves to locally damp the amplitude of vibrations that would otherwise have occurred if the tuning element 130 had not been provided at the targeted location. In many embodiments, the tuning element 130 targets high amplitude vibrations at frequencies greater than 5000 Hz. The club head 100 can comprise maximum amplitudes up to 70 decibels at a given frequency, and the inclusion of the tuning element 130 can reduce the amplitude by between 1 and 7 decibels. By specifically targeting locations where the most significant impact vibrations occur (i.e. vibrational "hotspots" 140 of the club head 100) and disposing the tuning element 130 at said hotspots 140, the tuning element 130 requires a relatively low mass to produce the same damping effect as a higher mass tuning element located away from the hotspot 140. As such, the sound and feel of the club head 100 can be improved using only a lightweight tuning element 130 that does not negatively influence the mass properties of the club head 100.

In many embodiments, as illustrated in FIG. 4B, the tuning element 130 is disposed on the second component 122. More specifically, the tuning element 130 can be disposed on a portion 150 of the second component 122 that forms the majority of the crown 108 of the club head 100, as opposed to the toe portion 152a of the second component 122 or the heel portion 152b of the second component 122. In many embodiments, the tuning element 130 can be located on an interior surface 127 of the crown 108. In many embodiments, the tuning element 130 is positioned on a rear heel portion of the crown 108. In many other embodiments, the tuning element 130 is positioned on a rear toe portion of the crown 108. The location of the tuning element on the crown 108 can correspond to a vibrational hotspot 140 location.

The tuning element 130 is capable of being easily coupled to the interior surface 127 of the second component 122. As illustrated in FIGS. 4A and 4B, the multi-component nature of the club head 100 allows for easy attachment of the tuning element 130 to the interior surface of the second component 122, because the tuning element 130 can be attached to the second component 122 before the internal cavity 128 is sealed. As discussed above, with multi-component club head constructions, the second component 122 is secured to the first component 120 via adhesives or mechanical means without using a heat source. The tuning element 130 can be attached prior to securing the second component 122 to the first component 120, because there is no heating process associated with securing the components 120, 122 that would damage the structural integrity of the tuning element 130.

The tuning element 130 is a lightweight member capable of being attached to a portion of the club head 100 (for instance, the interior surface 127 of the second component 122) to damp and dissipate dominant impact vibrations. In many embodiments, the tuning element 130 can be attached to the interior surface 127 of the second component 122 via the use of adhesives, epoxies, or the like. The tuning element 130 can comprise a plurality of layers formed from different materials. The tuning element 130 can comprise a three-layer structure or a two-layer structure.

Figure 5:
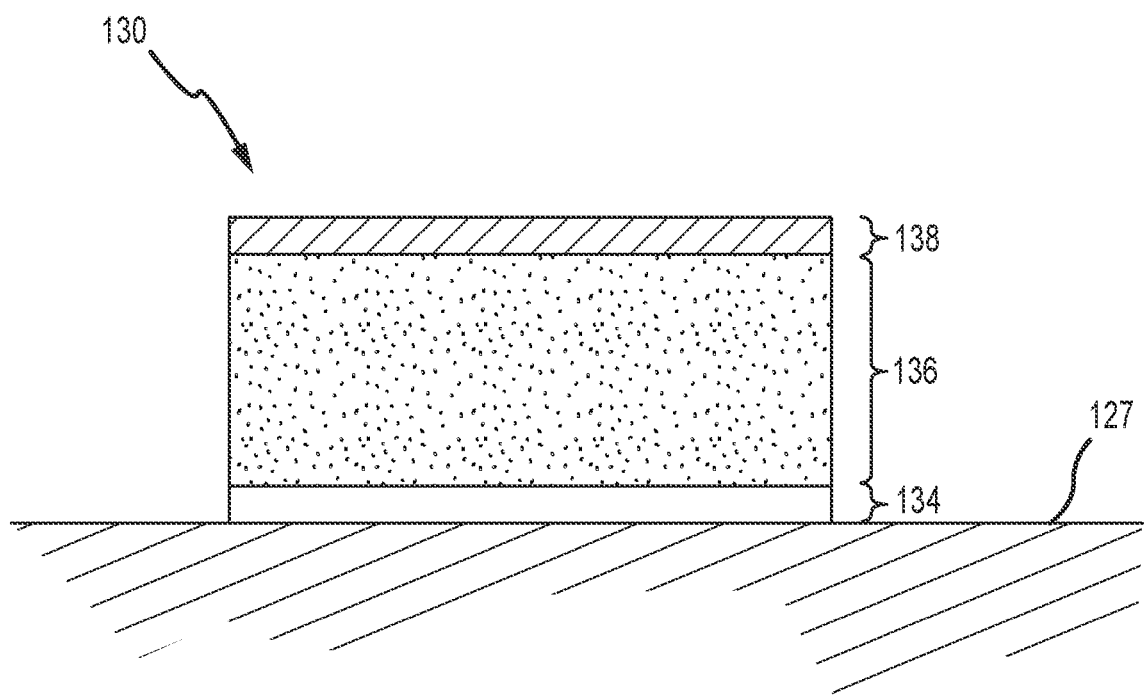
FIG. 5 illustrates a diagram of the tuning element comprising a plurality of layers.

In many embodiments, as illustrated by FIG. 5 the tuning element 130 comprises a three-layer structure. As illustrated by FIG. 5, the tuning element comprises an adhesive layer 134, a stiffening layer 138 opposite the adhesive layer 134, and a damping layer 136 sandwiched between the adhesive layer 134 and the stiffening layer 138. The adhesive layer 134 can form a bottom surface of the tuning element 130 and serves to adhere the tuning element 130 to the interior surface 127 of the second component 122. In such three-layer embodiments, the damping layer 136 can comprise a viscoelastic polymer configured to dissipate vibrations by converting kinetic energy into heat. The damping layer can comprise any viscoelastic polymer or material such as an elastomer, butyl rubber, silicone rubber, a thermoplastic elastomer (TPE), thermoplastic polyurethane (TPE), or other suitable materials with viscoelastic properties.

In many embodiments, the stiffening layer 138 comprises a thin layer of material that comprises a high tensile strength to provide rigidity to the tuning element 130 without contributing a significant amount of mass to the tuning element 130. In many embodiments, the stiffening layer 138 can be formed of a polymeric material, a composite material, or glass cloth. In some embodiments, the stiffening layer 138 can comprise a fiber-reinforced composite such as a woven glass, carbon fiber, or aramid polymer fiber reinforcing layer embedded in a polymeric resin. In alternative embodiments, the stiffening layer 138 can comprise a lightweight metallic material such as aluminum, aluminum foil, an aluminum alloy, titanium, a titanium alloy, magnesium, or a magnesium alloy.

As discussed above, the stiffening layer 138 comprises a high tensile strength that provides rigidity to the tuning element 130. In many embodiments, the tensile strength of the stiffening layer 138 can be greater than about 60 MPa, greater than about 110 MPa, greater than about 180 MPa, greater than about 220 MPa, greater than about 260 MPa, greater than about 280 MPa, or greater than about 290 MPa. In some embodiments, suitable composite materials may have a tensile strength at yield of from about 60 MPa to about 350 MPa.

Upon impact with a golf ball, the club head 100 flexes and vibrates. Similarly, the stiffening layer 138 will also flex and vibrate at impact. The flexing and vibration of the second component 122 and the stiffening layer 138 will impart a shear force on the damping layer 136, which is constrained between the interior surface 127 of the second component 122 and the stiffening layer 138. The shear force created by the vibration stretches the viscoelastic material in the damping layer 136. The viscoelastic nature of the damping layer 136 converts the kinetic energy of the vibration into heat energy. In this way, the tuning element 130 dissipates vibrational energy generated at the hotspot 140.

In other embodiments (not illustrated), the tuning element 130 comprises a two-layer structure. The two-layer structure of the tuning element 130 in some embodiments can be similar to the three-layer structure of other embodiments, except the two-layer structure can be devoid of a stiffening layer 138. In many embodiments, the two-layer structure of the tuning element 130 can simply comprise an adhesive layer 134 and a damping layer 136. In such embodiments, the damping layer 136 is exposed to the internal cavity 128 of the club head 100 and is not constrained by a stiffening member 138. In such embodiments, the damping layer 136 may or may not be a viscoelastic polymer, as described above. In addition to the polymers listed above, the damping layer 136 of the two-layer structure can alternatively be formed by other materials with damping properties such as foam, acrylic foam, felt, or a polymer-based glue.

In alternative embodiments, the tuning element 130 can be any lightweight material capable of being attached to a club head 100 to damp vibrations. In some embodiments, the tuning element 130 can be a polymer-based tape, such as Very High Bond (VHB) tape or other high bonding tape capable of bonding to the non-metallic second component 122. In other embodiments, the tuning element 130 can be a polymer-based glue. In some embodiments, the tuning element 130 can comprise a polymer or polymeric glue encased in a protective layer, such as a layer of plastic, that is adhesively bonded to the second component 122. In some embodiments, the tuning element 130 can comprise one or more tape layers, one or more adhesive layers, one or more epoxy layers, one or more foam layers, one or more viscoelastic layers, one or more felt layers, one or more composite layers, one or more polymeric layers, one or more glue layers, one or more glass-fiber layers, or a combination thereof.

The tuning element 130 can be a lightweight element comprising a low density that contributes an insignificant amount of mass relative to the overall mass of the club head 100. In this way, the addition of the tuning element 130 to the club head 100 does not significantly affect the overall club head mass or influence the mass properties of the club head 100, including moment of inertia (MOI) and center of gravity (CG) position.

The tuning element 130 can comprise a low-density ranging from between 0.5 g/cm$^3$ and 2 g/cm$^3$. In some embodiments, the density of the tuning element 130 can be between 0.5 g/cm$^3$ and 1.0 g/cm$^3$, between 0.75 g/cm$^3$ and 1.25 g/cm$^3$, between 1.0 g/cm$^3$ and 1.5 g/cm$^3$, between 1.25 g/cm$^3$ and 1.75 g/cm$^3$, or between 1.5 g/cm$^3$ and 2.0 g/cm$^3$. In some embodiments, the density of the tuning element 130 can be between 0.5 g/cm$^3$ and 1.5 g/cm$^3$, between 0.6 g/cm$^3$ and 1.6 g/cm$^3$, between 0.7 g/cm$^3$ and 1.7 g/cm$^3$, between 0.8 g/cm$^3$ and 1.8 g/cm$^3$, between 0.9 g/cm$^3$ and 1.9 g/cm$^3$, or between 1.0 g/cm$^3$ and 2.0 g/cm$^3$. In some embodiments, the density of the tuning element can be approximately 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, 1.4 g/cm$^3$, or 1.5 g/cm$^3$.

The tuning element 130 can comprise a mass between 0.5 grams and 10 grams. In many embodiments, the mass of the tuning element 130 is between 0.5 grams and 8 grams, between 0.5 grams and 6 grams, or between 0.5 grams and 4 grams. In some embodiments, the mass of the tuning element 130 is between 0.5 grams and 10 grams, between 0.5 grams and 8 grams, between 0.5 grams and 6 grams, between 0.5 grams and 4 grams, or between 0.5 grams and 2.0 grams. In some embodiments, the mass of the tuning element 130 is between 2 grams and 10 grams, between 2 grams and 8 grams, between 2 grams and 6 grams, or between 2 grams and 5 grams. In many embodiments, the mass of the tuning element 130 is approximately 0.5 grams, approximately 1 gram, approximately 1.5 grams, approximately 2 grams, approximately 2.5 grams, or approximately 3 grams.

Despite its lightweight nature, the tuning element 130 provides a significant damping effect to the golf club head 100. As discussed in further detail below, the tuning element 130 can dampen vibrational amplitudes occurring at frequencies greater than 5000 Hz by between 1 and 7 decibels. The lightweight nature of the tuning element 130 allows for the damping effect to occur without a significant alteration of the club head 100 mass properties.

Tuning Element Positioning

As discussed above, the tuning element 130 is strategically located at targeted positions of the club head body 100 to effectively damp unwanted vibrations without requiring a large amount of mass. The location of the tuning element 130 corresponds to a vibrational hotspot 140 location of the club head 100. As discussed above, and in reference to FIG. 7, hotspots 140 are defined herein as a location on the club head 100 that experiences the greatest amplitude of vibration at a natural frequency of the club head 100. The hotspot 140 is defined based on the vibrational response of the club head 100. The tuning element 130 is aligned with the hotspot 140. The hotspot 140 is the area of the club head 100 that comprises the most significant vibrations with respect to the overall acoustic response of the club head 100, often contributing to a loud and/or sharp sound. By determining the location of the hotspot 140 and placing the tuning element 130 at said hotspot 140, these significant vibrations can be damped and the overall acoustic response of the club head 100 can be improved (i.e. the club head 100 can sound more muted, quieter, and/or more dull). In some embodiments, the position of the tuning element 130 can correspond to one or more quadrants wherein the hotspot is located. In other embodiments, the position of the tuning element 130 can correspond to one or more vibration locating features 185 disposed on the crown 108, as discussed in further detail below.

The hotspot 140 location can be determined by performing routine modal analysis on the club head 100. Through such analysis, one or more natural frequencies of the club head 100 are determined, as well as the "shape" of each natural frequency (i.e. the amplitude of vibration within various regions of the club head 100 at the given natural frequency). The vibrational hotspot 140 can be located by determining the area of highest vibrational amplitude in the club head at a given natural frequency.

In many embodiments, the club head 100 comprises a natural frequency ranging from between 5000 Hz and 6500 Hz. In some embodiments, the club head 100 can comprise a natural frequency between 3000 Hz and 4000 Hz, between 3500 Hz and 4500 Hz, between 4000 Hz and 5000 Hz, between 4500 Hz and 5500 Hz, between 5000 Hz and 6000 Hz, between 5500 Hz and 6500 Hz, or between 6000 Hz and 7000 Hz. In some embodiments, the club head can comprise a natural frequency between 3000 Hz and 3500 Hz, between 3500 Hz and 4000 Hz, between 4000 Hz and 4500 Hz, between 4500 Hz and 5000 Hz, between 5000 Hz and 5500 Hz, between 5500 Hz and 6000 Hz, between 6000 Hz and 6500 Hz, or between 3000 Hz and 4000 Hz.

Figure 7:
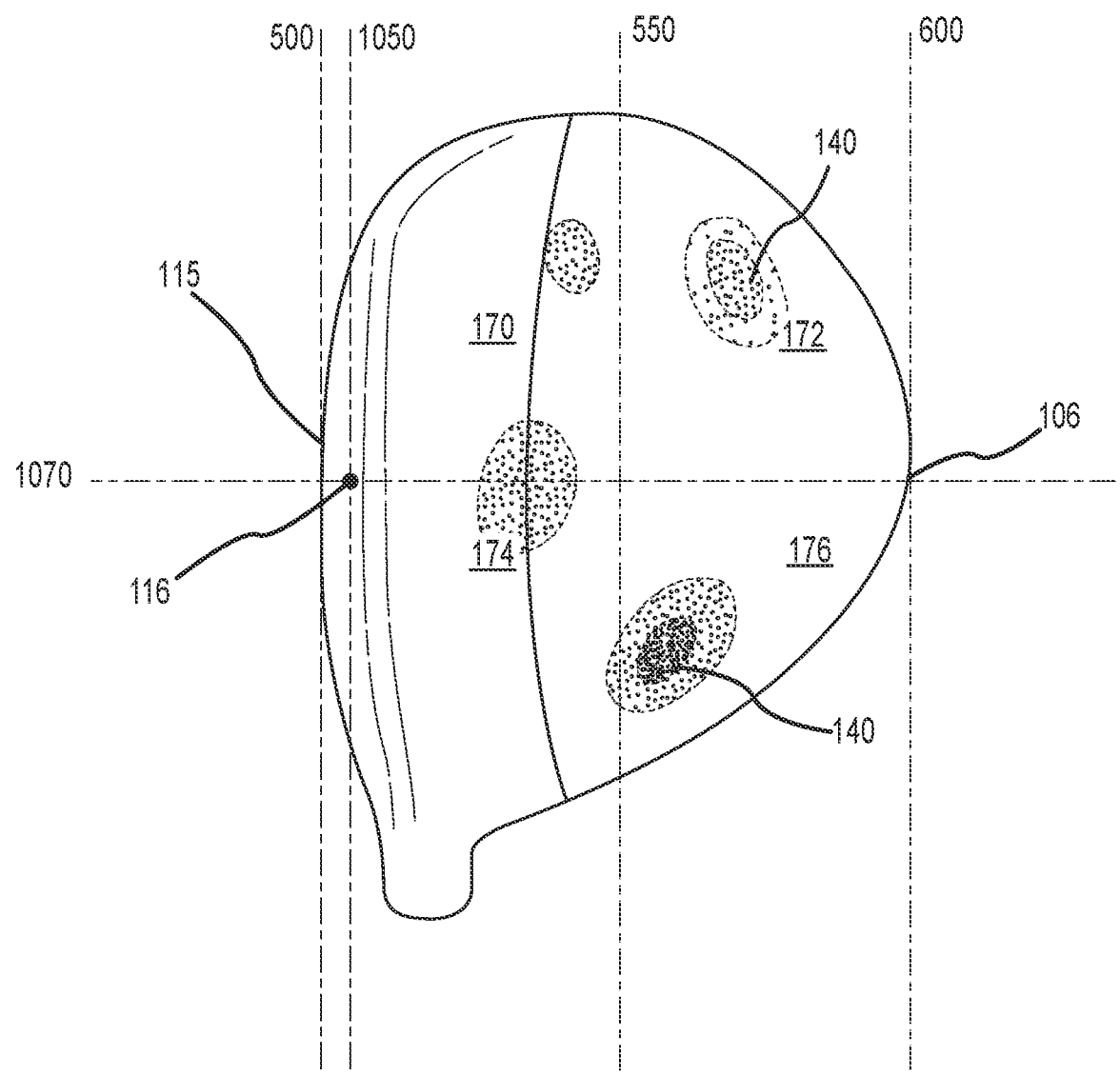
FIG. 7 illustrates a crown view of the club head of FIG. 1 comprising a plurality vibration hotspots.

FIG. 7 illustrates the amplitude of vibrations at various locations on the club head at a given natural frequency, as determined through modal analysis. More darkly shaded regions in the figure correspond to areas with greater vibrational amplitude. As illustrated by FIG. 7, the hotspot 140 occurs in the rear-heel quadrant 176 of the club head 100. The tuning element 130 can be positioned at the location of the hotspot 140 in order to damp (i.e. reduce the amplitude of) the dominant vibrations occurring at the hotspot 140 and in the surrounding area. By directly placing the tuning element 130 at the location of the hotspot 140, the tuning element 130 provides more effective damping to the dominant vibrations occurring at the hotspot 140 than a tuning element located elsewhere. Precise placement of the tuning element 130 at the location of the hotspot 140 allows the tuning element 130 to provide a significant damping effect without requiring a significant amount of mass.

High vibrational amplitudes occurring at the above frequencies (for example at a frequency between 5000 Hz and 6500 Hz) cause an undesirable acoustic response in the golf club head 100 at impact. In many embodiments, before application of the tuning element 130, the maximum vibrational amplitude at a given frequency can be greater than approximately 66 decibels, greater than 67 decibels, greater than 68 decibels, greater than 69 decibels, greater than 70 decibels, greater than 71 decibels, or greater than 72 decibels.

The tuning element 130 provides a significant damping effect that reduces the dominant vibrations occurring at the hotspot 140. In some embodiments, the tuning element 130 can reduce the maximum amplitude at the natural frequency by between 1 decibels and 7 decibels. In some embodiments, the tuning element 130 can reduce the maximum amplitude of the natural frequency by between 1 decibel and 3 decibels, between 2 decibels and 4 decibels, between 3 decibels and 5 decibels, between 4 decibels and 6 decibels, or between 5 decibels and 7 decibels. In some embodiments, the tuning element 130 can reduce the maximum amplitude of the natural frequency by greater than 1 decibel, greater than 2 decibels, greater than 3 decibels, greater than 4 decibels, greater than 5 decibels, greater than 6 decibels, or greater than 7 decibels.

Because the decibel scale is a logarithmic expression of amplitude, a decrease of even 1 or 2 decibels correlates to a significant decrease in vibrational energy. As an example of the logarithmic expression of amplitude, Table 1 below relates the linear magnitude of vibrational energy experienced by the golf club 100 to decibel values relating to typical peak amplitudes experienced by the golf club head 100.

TABLE 1

| Vibrational Amplitude (decibels) | Vibrational Energy Magnitude (unitless) |
|---|---|
| 70 | $8.37 * 10^6$ |
| 69 | $7.46 * 10^6$ |
| 68 | $6.65 * 10^6$ |
| 67 | $5.92 * 10^6$ |
| 66 | $5.28 * 10^6$ |
| 65 | $4.71 * 10^6$ |
| 64 | $4.19 * 10^6$ |
| 63 | $3.74 * 10^6$ |
| 62 | $3.33 * 10^6$ |
| 61 | $2.97 * 10^6$ |
| 60 | $2.65 * 10^6$ |

As can be seen from Table 1, a decrease in amplitude of 1 decibel (for example, the decrease between 70 decibels and 69 decibels) results in a 10.9% decrease in vibrational energy. Similarly, for example, a 6 decibel decrease in amplitude (i.e. the decrease between 70 decibels and 64 decibels) results in a 50% decrease in vibrational energy. Similarly, a 10 decibel decrease (for example a decrease from 70 decibels to 60 decibels) corresponds to a 68% decrease in vibrational energy. Such significant decreases in the vibrational energy at a given natural frequency (i.e. a natural frequency greater than 5000 Hz) result in significant improvements to the acoustic response of the club head 100.

In some embodiments, the club head 100 can comprise multiple hotspots 140 in different locations, either at the same natural frequency or at a different natural frequency. In such embodiments, the club head can comprise a first tuning element 130 corresponding to the location of a first hotspot 140 and a second tuning element (not shown) corresponding to the location of a second hotspot 140. As illustrated in FIG. 7, the club head 100 comprises a first hotspot 140 located in the rear-heel quadrant 176 and a second hotspot 140 located in the rear-toe quadrant 172.

As shown in FIG. 6, the location of the tuning element 130 can be characterized in relation to the club head 100 quadrant system. In many embodiments, the tuning element is located in the rear-heel quadrant. In other embodiments, the tuning element 130 can be located in the front-toe quadrant 170, the rear-toe quadrant 172, the front-heel quadrant 174, the rear-heel quadrant 176, or a combination thereof. In some embodiments, the tuning element 130 can be located solely within a single quadrant such as solely within the front-toe quadrant 170, solely within the rear-toe quadrant 172, solely within the front-heel quadrant 174, or solely within the rear-heel quadrant 176. In some embodiments, the tuning element 130 can be located at least partially in the front-toe quadrant 170, at least partially in the rear-toe quadrant 172, at least partially in the front-heel quadrant 174, and/or at least partially in the rear-heel quadrant 176. In many embodiments, as shown in FIG. 6, a portion of the tuning element 130 can be located in the rear-heel quadrant 176 and a portion of the tuning element can be located in the front-heel quadrant 174. In many other embodiments, the tuning element can be partially located in the rear-toe quadrant 172 and partially located in the front-toe quadrant 170.

The location of the tuning element 130 can further be characterized in relation to the location of its center. As illustrated in FIG. 6, the tuning element 130 can define a tuning element center point 132 midway between the peripheral edges of the tuning element 130. The tuning element center point 132 is located half the heel-to-toe distance between a heel-most point or edge of the tuning element 130 and a toe-most point or edge of the tuning element 130. Similarly, the tuning element center point 132 is located half the front-to-rear distance between a forward-most point or edge of the tuning element 130 and a rear-most point or edge of the tuning element 130. The tuning element 130 can be rectangular, circular, elliptical, or any other shape or geometry. Regardless of the shape of the tuning element 130, the center point 132 is defined as the midway point between the heel-most and toe-most extents as well as the midway point between the forward-most and rear-most extents of the tuning element 130.

Additionally, the location of the tuning element 130 can be described in relation to the quadrant harboring the tuning element center point 132. In many embodiments, as illustrated by FIG. 6, the tuning element center point 132 is located in the rear-heel quadrant 176. In other embodiments, the tuning element center point 132 can be located in the front-toe quadrant 170, the rear-toe quadrant 172, or the front-heel quadrant 174.

The location of the tuning element 130 can further be described in relation to a front-to-rear or offset distance DI between the front end reference plane 500 and the tuning element center point 132. The offset distance DI is a perpendicular distance measured from the front end reference plane 500 to the tuning element center point 132 in the direction of the Z-axis 1070. In some embodiments, the offset distance DI between the front end reference plane 500 and the tuning element center point 132 can be between approximately 1.5 inches and 2.5 inches. In some embodiments, the offset distance DI between the front end reference plane 500 and the tuning element center point 132 can be between 1.5 inches and 2.0 inches, between 1.75 inches and 2.25 inches, or between 2.0 inches and 2.5 inches. In some embodiments, the offset distance DI between the front end reference plane 500 and the tuning element center point 132 can be between 1.5 inches and 1.7 inches, between 1.6 inches and 1.8 inches, between 1.7 inches and 1.9 inches, between 1.8 inches and 2.0 inches, between 1.9 inches and 2.1 inches, between 2.0 inches and 2.2 inches, between 2.1 inches and 2.3 inches, between 2.2 inches and 2.4 inches, or between 2.3 inches and 2.5 inches. In some embodiments, the offset distance DI between the front end reference plane 500 and the tuning element center point 132 can be approximately 1.7 inches, approximately 1.8 inches, approximately 1.9 inches, approximately 2.0 inches, approximately 2.1 inches, approximately 2.2 inches, or approximately 2.3 inches.

Figure 8A:
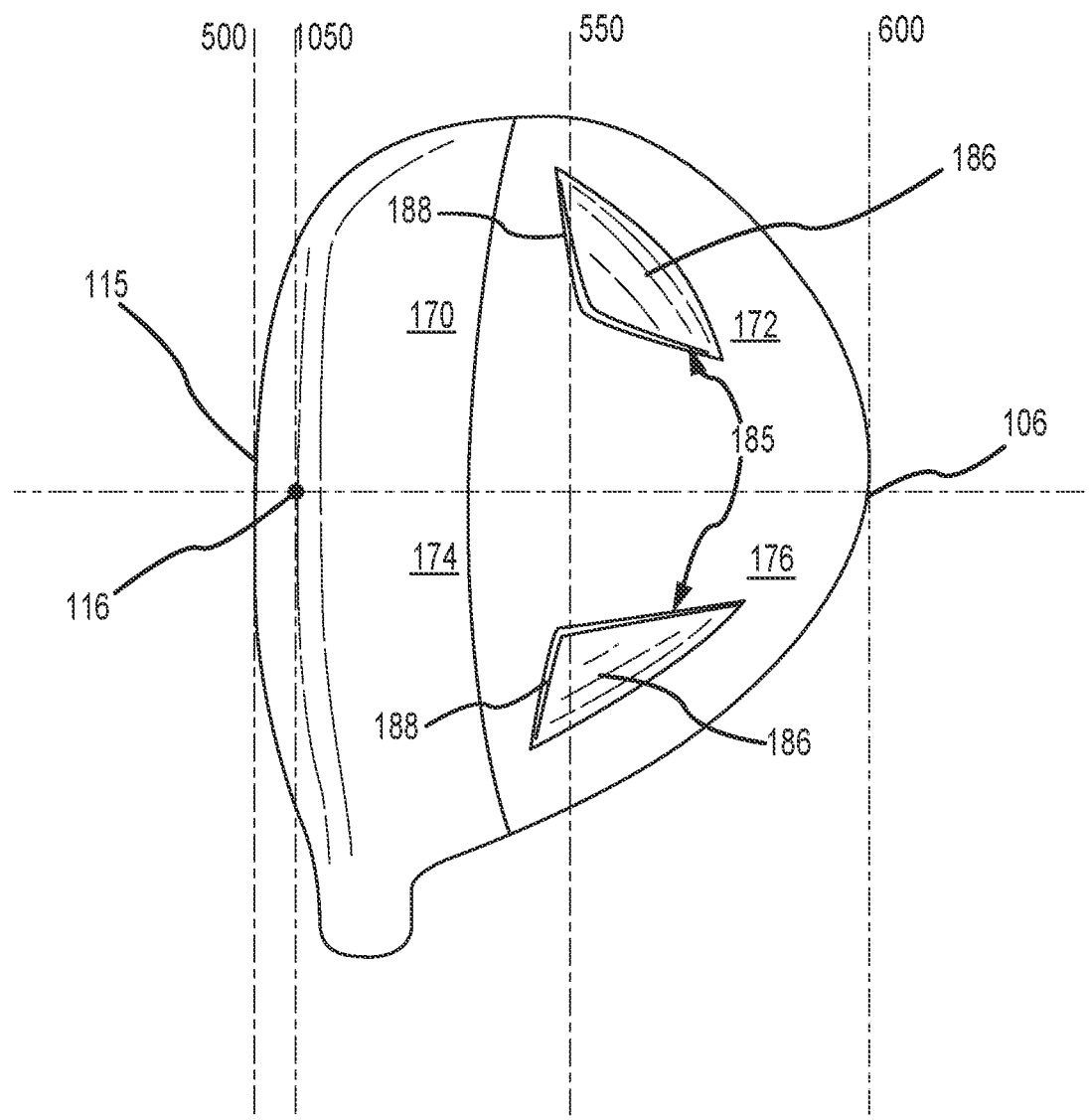
FIG. 8A illustrates a crown view of the club head of FIG. 1 further comprising crown locating features.
Figure 8B:
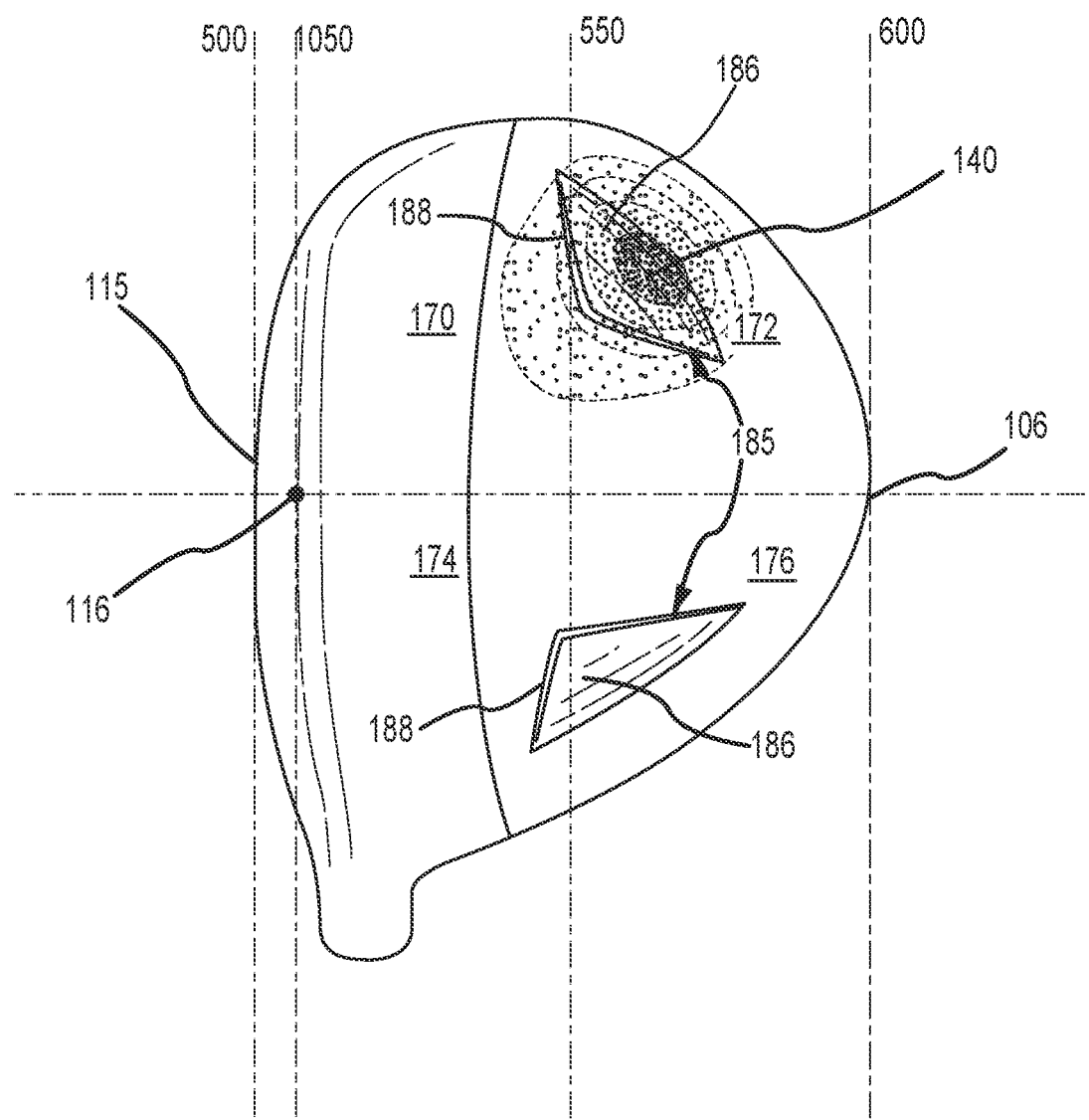
FIG. 8B illustrates a crown view of the club head of FIG. 8A, further comprising a plurality of vibration hotspots.

In some embodiments, the club head can further comprise one or more physical features that influence the location of the club head vibrational hotspots 140. FIGS. 8A and 8B illustrate an embodiment of the multi-component club head 100 comprising a plurality of locating features 185 on the crown 108. The plurality of locating features 185 can each form a recessed area 186 in the exterior surface of the crown 108. Each locating feature 185 can comprise an edge 188 separating the recessed area 186 from the adjacent, non-recessed areas of the crown 108. The locating feature 185 influences the location of the hotspot by creating a discontinuity in the surface of the otherwise smooth and uniformly shaped crown 185. Such discontinuities are common areas for vibrational hotspots 140 to occur, because the discontinuities create slightly weakened areas in the crown 108 that tend to vibrate more than other areas. As illustrated by FIG. 8B, the hotspot 140 of the multi-material club head 100 occurs proximate the locating feature 185. Including locating features 185 in the crown 108 of the club head 100 reduces the variability of the hotspot 140 location from club to club. As such, the hotspot is more repeatably and accurately located during manufacture due to the inclusion of the locating feature 185. The ability to accurately and repeatably locate the hotspot leads to more precise and effective placement of the tuning element 130.

Figure 9:
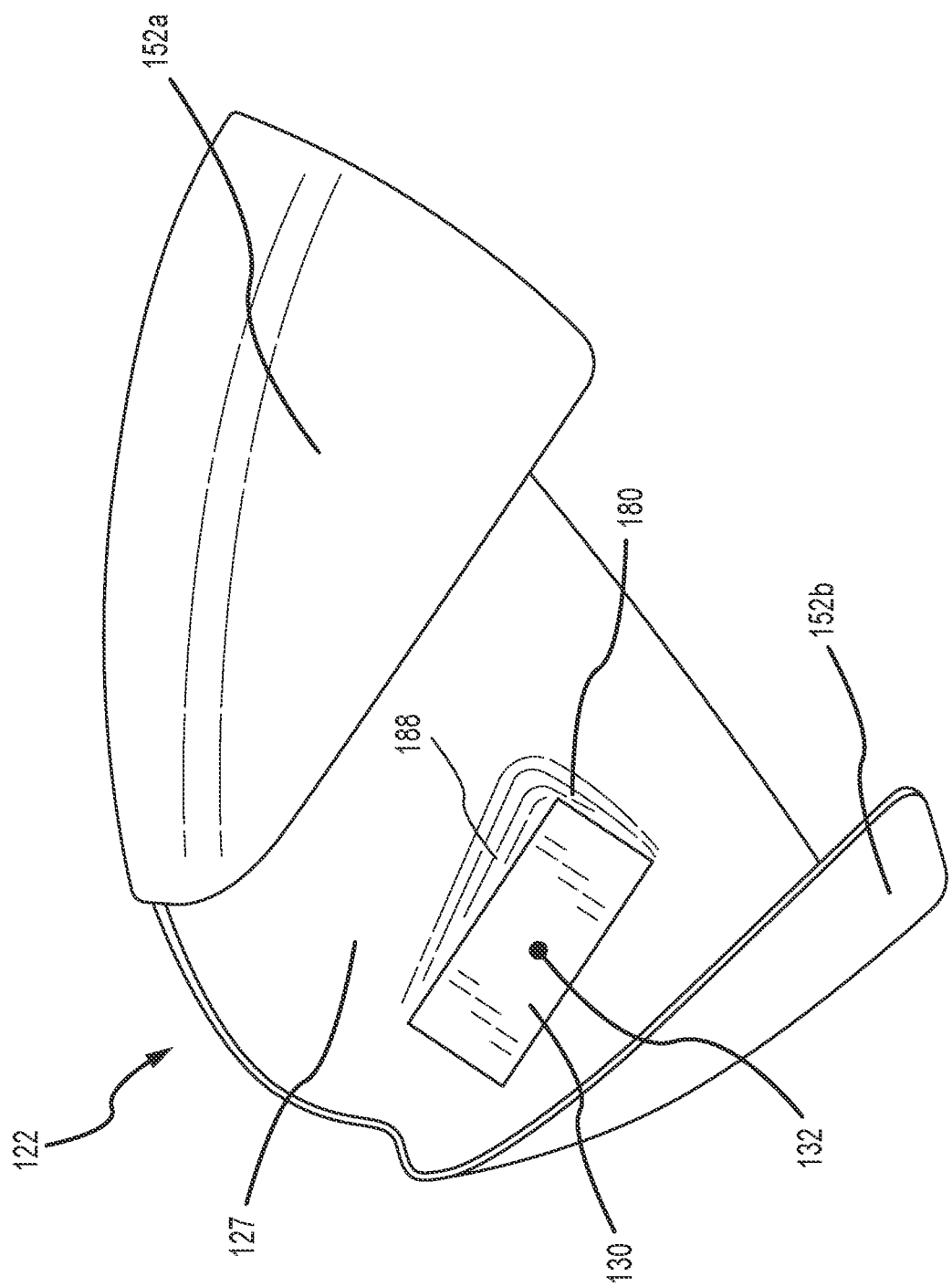
FIG. 9 illustrates a rear perspective view of the second component from the club head of FIG. 1 comprising the tuning element.

In addition to providing control over the location of the hotspot 140, the locating feature 185 can also double as a natural alignment feature on the interior surface 127 of the crown 108 to allow for accurate and repeatable placement of the tuning element 130 during manufacture. As shown in FIG. 9, the edge 188 of the locating feature 185 extends from the interior surface 127 of the second component 122 into the internal cavity 128, and the recessed area 186 on the exterior surface of the club head 100 can form a protrusion 180 into the internal cavity 128 from the interior surface 127. The protrusion 180 serves as an alignment feature visually signifying the desired position of the tuning element 130. The protrusion 180 can form a surface for the tuning element 130 to be adhered to, and the edge 188 can orient the placement of the tuning element.

As discussed above, the locating feature 185 influences the hotspot 140 to occur at a specific, consistent location on the crown 108. The locating feature 185 also forms a protrusion 180 serving as an alignment feature at the same location of the hotspot 140, on the interior surface 127 of the crown 108. Because the protrusion 180 is associated with the hotspot 140 location, the tuning element 130 can be repeatably and accurately aligned with the protrusion 180, in the exact location necessary for efficiently damping the vibrations occurring at the hotspot 140.

Additional Sound Benefits

In addition to damping the amplitude of dominant vibrations, the inclusion of the tuning element 130 can also influence the amount of time the club head 100 vibrates after impact. The tuning element 130 can reduce the total duration of the vibrational response as well as the duration that high amplitude vibrations occur. The total duration of the vibrational response can be separated into a "sustain" phase and a "release" phase. The sustain phase refers to an interval of time beginning at impact and ending when the response dips below 20% of the maximum amplitude value. The sustain phase characterizes the amount of time that dominant vibrations occur. If the vibrational response comprises a relatively long sustain phase, the sound at impact is perceived as being louder. In contrast, reducing the duration of the sustain phase makes the sound at impact perceived to be more muted, even if the maximum amplitude remains the same. The release phase refers to an interval of time beginning when the vibrational response dips below 20% of the maximum amplitude (i.e. at the end of the sustain phase) and ends when the club head 100 stops vibrating. The release phase characterizes the amount of time that less significant vibrations occur. A prolonged release phase can contribute to a "ringing" sensation of the club head 100. As described below in various examples, the inclusion of the tuning element 130 reduces both the sustain and release phase durations (and thus the total duration) of the club head 100 vibrational response, producing a more pleasing sound at impact.

In many prior art club heads devoid of tuning elements, total duration of the vibrational response can range between approximately 36 milliseconds to approximately 40 milliseconds, the sustain duration can range between approximately 8 milliseconds to approximately 12 milliseconds, and the release duration can range between approximately 27 milliseconds to approximately 31 milliseconds. In many embodiments, the inclusion of the tuning element 130 can reduce the total duration of the vibrational response by greater than 1 millisecond, greater than 2 milliseconds, greater than 3 milliseconds, greater than 4 milliseconds, greater than 5 milliseconds, greater than 6 milliseconds, greater than 7 milliseconds, greater than 8 milliseconds, greater than 9 milliseconds, or greater than 10 milliseconds. The reduction of the vibrational response duration leads to an acoustic response that is more muted and comprises less ringing after impact.

Center of Gravity and Moment of Inertia Properties

The precise location of the tuning element 130 with respect to the vibrational hotspots 140 of the club head 100 provides significant vibration damping and acoustic improvements, while allowing the tuning element 130 to comprise a small amount of mass. The lightweight nature of the tuning element 130 allows the tuning element 130 to be disposed on specific locations on the crown 108 without negatively influencing the properties of the club head 200, such as moment of inertia properties or center of gravity 1000 position.

Considerations involving the placement of the tuning element 130 (i.e. crown placement) often add mass to the crown 108 which can negatively impact center of gravity (CG) and moment of inertia (MOI) properties. However, the club head 100 comprising the lightweight tuning element 130 can further comprise a beneficial center of gravity 1000 location and increased moment of inertia properties. The multi-component club head 100 comprising the lightweight tuning element 130 can further comprise a low and rear center of gravity 1000 position. The multi-component club head 100 comprising the lightweight tuning element 130 can further comprise a high moment of inertia Ixx and Iyy. The multi-component club head 100 comprising the lightweight tuning element 130, a low and rear center of gravity 1000 position, and a high moment of inertia provides the club head 100 with superior sound control, feel, and playability.

To achieve beneficial center of gravity 1000 position and high moment of inertia properties, the club head 100 can further comprise structures that affect club head mass properties such as removable weight 119, thinned crown 108, and/or lightweight crown 108 formed from a non-metal material. These structures allow for the adjustment of the mass properties to achieve a low and rear CG position and high moment of inertia properties. These structures allow for weight adjustments or weight savings that can be combined with crown tuning elements 130 that provide sound control. The crown tuning element 130 does not negatively affect the center of gravity 1000 and moment of inertia properties. The crown tuning element 130 minimally affects the center of gravity 1000 location (i.e. minimally moves the CG forward toward the front end 104 and upwards toward the crown 108), and moment of inertia (i.e. a small MOI percentage difference between the club head 100 having the tuning element 130 and the club head devoid of the tuning element). The crown tuning element 130 minimally affects center of gravity 1000 and moment of inertia properties while providing substantial sound control benefits over a similar club head devoid of the tuning element 130.

As described above and with reference to FIGS. 2 and 3, the center of gravity 1000 is located within the coordinate system defined at the face center 116 having the x-axis 1050, the y-axis 1060, and the z-axis 1070. The x-axis 1050 extends in a positive direction toward the heel end. The y-axis 1060 extends in a positive direction toward the crown. The z-axis 1070 extends in a positive direction toward the rear end 106. The club head 100 preferably comprises a "down-and-back", or "low and rear" CG position (i.e. positioning the CG toward the sole and the rear of the club head). Such a down-and-back CG position provides improved launch characteristics that lead to a higher performing club head. The inclusion of the crown tuning element 130 minimally affects the center of gravity 1000 location when compared to a similar club head devoid of the tuning element 130. Described below are desirable center of gravity 100 locations that provide a low and rear CG position.

The club head 100 comprising the tuning element 130 can comprise a CG x-axis 1050 location, a CG y-axis 1060 location, and a CG z-axis 1070 location (hereafter "CG location") that is shifted when compared to a similar club head devoid of the crown tuning element 130. For example, in many embodiments, the CG location of the club head 100 having the crown tuning element 130 can be between 0.5% to 5% of the CG location of the similar club head devoid of the crown tuning element 130. In other embodiments, the CG location of the club head 100 having the crown tuning element 130 can be between 0.5% to 2.5%, or 2.5% to 5% of the CG location of the similar club head devoid of the crown tuning element 130. For example, the CG location of the club head 100 having the crown tuning element 130 can be 0.5%, 1%, 2%, 3%, 4%, or 5% of the CG location of the similar club head devoid of the crown tuning element 130.

For drivers, the CG 1000 comprises an x-axis 1050 location ranging between −2 mm to 6 mm. In other embodiments, the CG 1000 comprises an x-axis 1050 location ranging between −2 mm to 2 mm, or 2 mm to 6 mm. For example, the CG 1000 comprises an x-axis 1050 location at −2, −1.5, −1, 0, 1, 1.5, 2, 2.5, 3, 3.5, 4, 4.5, 5, 5.5, or 6 mm.

For fairway woods, the CG 1000 comprises an x-axis 1050 location ranging between −7 mm to 1 mm. In other embodiments, the CG 1000 comprises an x-axis 1050 location ranging between −7 mm to −3 mm, or −3 mm to 1 mm. For example, the CG 1000 comprises an x-axis 1050 location at −7, −6, −5, −4, −3, −2, −1, 0, 0.5, or 1 mm.

For hybrids, the CG 1000 comprises an x-axis 1050 location ranging between −5 mm to 2 mm. In other embodiments, the CG 1000 comprises an x-axis 1050 location ranging between −5 mm to −1 mm, or −1 mm to 2 mm. In other embodiments still, the CG 1000 comprises an x-axis 1050 location ranging between −4 mm to 0 mm, −3 mm to 1 mm, or −2 mm to 2 mm. For example, the CG 1000 comprises an x-axis 1050 location at −5, −4, −3, −2.5, −2, −1.5, −1, −0.5, 0, 0.5, 1, 1.5, or 2 mm.

For drivers, the CG 1000 comprises a y-axis 1060 location ranging between −4 mm to −10 mm. In other embodiments, the CG 1000 comprises a y-axis 1060 location ranging between −4 to −7 mm, or −7 mm to −10 mm. For example, the CG 1000 comprises a y-axis 1060 location at −4, −5, −6, −7, −8, −9, or −10 mm.

For fairway woods, the CG 1000 comprises a y-axis 1060 location ranging between −3 mm to −12 mm. In other embodiments, the CG 1000 comprises a y-axis 1060 location ranging between −3 mm to −7 mm, or −7 mm to −12 mm. For example, the CG 1000 comprises a y-axis 1060 location at −3, −4, −5, −6, −7, −8, −9, −10, −11, or −12 mm.

For hybrids, the CG 1000 comprises a y-axis 1060 location ranging between −3 mm to −12 mm. In other embodiments, the CG 1000 comprises a y-axis 138 location ranging between −3 mm to −8 mm, or −8 mm to −12 mm. In other embodiments still, the CG 1000 comprises a y-axis 138 location ranging between −4 mm to −8 mm, −5 mm to −9 mm, −6 mm to −10 mm, −7 mm to −11 mm, or −8 mm to −12 mm. For example, the CG 1000 comprises a y-axis 1060 location at −3, −4, −5, −6, −7, −8, −9, −10, −11, or −12 mm.

For drivers, the CG 1000 can comprise a z-axis 1070 location greater than 38 mm, greater than 40 mm, greater than 42 mm, greater than 45 mm, or greater than 48 mm. In other embodiments, the CG 1000 can comprise a z-axis 1070 location ranging between 38 mm to 55 mm. In other embodiments, the CG 1000 can comprise a z-axis 1070 location ranging between 38 mm to 45 mm, or 45 to 55 mm. For example, the CG 1000 can comprise a z-axis location at 38, 39, 40, 41, 42, 43, 44, 45, 46, 47, 48, 49, 50, or 55 mm.

For fairway woods, the CG 1000 can comprise a z-axis 1070 location greater than 25 mm, greater than 28 mm, or greater than 30 mm. In other embodiments, the CG 1000 can comprise a z-axis 1070 location ranging between 25 mm to 40 mm. In other embodiments, the CG 1000 can comprise a z-axis 1070 location between 25 mm to 32 mm, or 32 mm to 40 mm. For example, the CG 1000 comprises a z-axis 1070 location of 25, 30, 31, 32, 33, 34, 35, 36, 37, 38, 39, or 40 mm.

For hybrids, CG 1000 can comprise a z-axis 1070 location greater than 15 mm, greater than 18 mm, greater than 20 mm, greater than 22 mm, or greater than 24 mm. In other embodiments, the CG 1000 can comprise a z-axis 1070 location ranging between 15 mm to 30 mm. In other embodiments, the CG 1000 can comprise a z-axis 1070 location between 15 mm to 25 mm, or 25 mm to 30 mm. In other embodiments still, the CG 1000 can comprise a z-axis 1070 location between 16 mm to 26 mm, 17 mm to 27 mm, 18 mm to 28 mm, 19 mm to 29 mm, or 20 mm to 30 mm. For example, the CG 1000 comprises a z-axis 1070 location of 15, 16, 17, 18, 19, 20, 21, 22, 23, 24 25, or 30 mm.

As described above and with reference to FIGS. 2 and 3, the center of gravity (CG) 1000 defines the origin for the coordinate system having the CG x-axis 2050, CG y-axis 2060, CG z-axis 2070. The CG x-axis 2050 is parallel to the x-axis 1050, the CG y-axis 2060 is parallel to the y-axis 1060, and the CG z-axis 2070 is parallel to the z-axis 1070. Further, the club head 100 comprises the moment of inertia Ixx about the CG x-axis 1050 (i.e. crown-to-sole moment of inertia), and the moment of inertia Iyy about the CG y-axis 1060 (i.e. heel-to-sole moment of inertia).

The club head 100 moment of inertia is desired to be increased or maximized, as a greater MOI results in a club head with increased forgiveness for impacts offset from the center 116 of the striking face 102. The MOI is a property of the perimeter mass distribution of the club head 100. In general, the discretionary mass of the club head 100 is strategically allocated throughout the club head 100 to maximize the moment of inertia about the CG x-axis 2050 (Ixx) and the moment of inertia about the CG y-axis 2060 (Iyy). The inclusion of the crown tuning element 130 minimally affects the moment of inertia properties when compared to a similar club head devoid of the tuning element 130. Described below are desirable moment of inertia values that provide high forgiveness.

The club head 100 comprising the tuning element 130 can comprise the moment of inertia Ixx and moment of inertia Iyy (hereafter "moment of inertia") that is different when compared to a similar club head devoid of the crown tuning element 130. For example, in many embodiments, the moment of inertia of the club head 100 having the crown tuning element 130 can be between 0.5% to 5% of the moment of inertia of the similar club head devoid of the crown tuning element 130. In other embodiments, the moment of inertia of the club head 100 having the crown tuning element 130 can between 0.5% to 2.5%, or 2.5% to 5% of the moment of inertia of the similar club head devoid of the crown tuning element 130. For example, the moment of inertia of the club head 100 comprising the crown tuning element 130 can be 0.5%, 1%, 2%, 3%, 4%, or 5% of the moment of inertia of the similar club head devoid of the crown tuning element 130.

For drivers, in many embodiments, the crown-to-sole moment of inertia Ixx can be greater than approximately 3000 g-cm$^2$, greater than approximately 3250 g-cm$^2$, greater than approximately 3500 g-cm$^2$, greater than approximately 3750 g-cm$^2$, greater than approximately 4000 g-cm$^2$, greater than approximately 4250 g-cm$^2$, greater than approximately 4500 g-cm$^2$, greater than approximately 4750 g-cm$^2$, or greater than approximately 5000 g-cm$^2$.

For drivers, in other embodiments, the crown-to-sole moment of inertia Ixx can range between 3000 to 5000 g-cm$^2$. In other embodiments, the crown-to-sole moment of inertia Ixx can range between 3000 to 4000 g-cm$^2$, or 4000 to 5000 g-cm$^2$. For example, the crown-to-sole moment of inertia Ixx can be 3000, 3100, 3200, 3300, 3400, 3500, 3600, 3700, 3800, 3900, 4000, 4100, 4200, 4300, 4400, 4500, 4600, 4700, 4800, 4900, or 5000 g-cm$^2$.

For fairway woods, in many embodiments, the crown-to-sole moment of inertia Ixx can be greater than approximately 1200 g-cm$^2$, greater than approximately 1300 g-cm$^2$, greater than approximately 1400 g-cm$^2$, greater than approximately 1500 g-cm$^2$, greater than approximately 1600 g-cm$^2$, greater than approximately 1700 g-cm$^2$, greater than approximately 1800 g-cm$^2$, or greater than approximately 1900 g-cm$^2$.

For fairway woods, in other embodiments, the crown-to-sole moment of inertia Ixx can range between 1200 to 2200 g-cm$^2$. In other embodiments, the crown-to-sole moment of inertia Ixx can range between 1200 to 1700 g-cm$^2$, or 1700 to 2200 g-cm$^2$. For example, the crown-to-sole moment of inertia Ixx can be 1200, 1300, 1400, 1500, 1600, 1700, 1800, 1900, 20040, 2100, or 2200 g-cm$^2$.

For hybrids, in many embodiments, the crown-to-sole moment of inertia Ixx can be greater than approximately 880 g-cm$^2$, greater than approximately 890 g-cm$^2$, greater than approximately 900 g-cm$^2$, greater than approximately 910 g-cm$^2$, greater than approximately 920 g-cm$^2$, greater than approximately 930 g-cm$^2$, greater than approximately 940 g-cm$^2$, greater than approximately 950 g-cm$^2$, or greater than approximately 960 g-cm$^2$.

For hybrids, in other embodiments, the crown-to-sole moment of inertia Ixx can range from 880 to 1500 g-cm$^2$. In other embodiments, the crown-to-sole moment of inertia Ixx can range from 880 to 1200 g-cm$^2$, or 1200 to 1500 g-cm$^2$. In other embodiments still, the crown-to-sole moment of inertia Ixx can range from 900 to 1300 g-cm$^2$, 1000 to 1400 g-cm$^2$, or 1100 to 1500 g-cm$^2$. For example, the crown-to-sole moment of inertia Ixx can be 880, 900, 920, 930, 940, 950, 960, 970, 980, 990, 1000, 1020, 1100, 1200, 1300, 1400, or 1500 g-cm$^2$.

For drivers, in many embodiments, the heel-to-toe moment of inertia Iyy can be greater than approximately 4500 g-cm$^2$, greater than approximately 4800 g-cm$^2$, greater than approximately 5000 g-cm$^2$, greater than approximately 5100 g-cm$^2$, greater than approximately 5250 g-cm$^2$, greater than approximately 5500 g-cm$^2$, greater than approximately 5750 g-cm$^2$, or greater than approximately 6000 g-cm$^2$.

For drivers, in other embodiments, the heel-to-toe moment of inertia Iyy can range between 4500 and 6000 g-cm$^2$. In other embodiments, the heel-to-toe moment of inertia Iyy can range between 4500 to 5200 g-cm$^2$, or 5200 to 6000 g-cm$^2$. For example, the heel-to-toe moment of inertia Iyy can be 4500, 4600, 4700, 4800, 4900, 5000, 5100, 5200, 5300, 5400, 5500, 5600, 5700, 5800, 5900, or 6000 g-cm².

For fairway woods, the heel-to-toe moment of inertia Iyy can be greater than approximately 2700 g-cm², greater than approximately 2800 g-cm², greater than approximately 2900 g-cm², greater than approximately 3000 g-cm², greater than approximately 3100 g-cm², greater than approximately 3200 g-cm², or greater than approximately 3300 g-cm².

For fairway woods, the heel-to-toe moment of inertia Iyy can range between 2700 and 3500 g-cm². In other embodiments, the heel-to-toe moment of inertia Iyy can range between 2700 to 3100 g-cm², or 3100 to 3500 g-cm². In other embodiments still, the heel-to-toe moment of inertia Iyy can range between 2700 to 3200 g-cm², or 3200 to 3500 g-cm². For example, the heel-to-toe moment of inertia Iyy can be 2700, 2800, 2900, 3000, 3100, 3200, 3300, 3400, or 3500 g-cm².

For hybrids, in many embodiments, the heel-to-toe moment of inertia Iyy can be greater than approximately 2400 g-cm², greater than approximately 2500 g-cm², greater than approximately 2600 g-cm², greater than approximately 2700 g-cm², greater than approximately 2800 g-cm², greater than approximately 2900 g-cm², or greater than approximately 3000 g-cm².

For hybrids, in other embodiments, the heel-to-toe moment of inertia Iyy can range from 2400 to 3200 g-cm². In other embodiments, the heel-to-toe moment of inertia Iyy can range from 2400 to 2700 g-cm², or 2700 to 3200 g-cm². In other embodiments still, the heel-to-toe moment of inertia Iyy can range from 2400 to 2900, 2500 to 3000, 2600 to 3100, or 2700 to 3200 g-cm². For example, the heel-to-toe moment of inertia Iyy can be 2400, 2500, 2600, 2700, 2750, 2800, 2850, 2900, 2950, 3000, 3100, or 3200 g-cm².

For drivers, the combined moment of inertia (i.e. the sum of the crown-to-sole moment of inertia Ixx and the heel-to-sole moment of inertia Iyy) can be greater than 8000 g-cm², greater than 8500 g-cm², greater than 9000 g-cm², greater than 9500 g-cm², greater than 10000 g-cm², greater than 11000 g-cm², or greater than 12000 g-cm².

For fairway woods, the combined moment of inertia (i.e. the sum of the crown-to-sole moment of inertia Ixx and the heel-to-sole moment of inertia Iyy) can be greater than 4000 g-cm², greater than 4100 g-cm², greater than 4200 g-cm², greater than 4300 g-cm², greater than 4400 g-cm², greater than 4500 g-cm², greater than 4600 g-cm², greater than 4700 g-cm², or greater than 4800 g-cm².

For hybrids, the combined moment of inertia (i.e. the sum of the crown-to-sole moment of inertia Ixx and the heel-to-sole moment of inertia Iyy) can be greater than 3500 g-cm², greater than 3600 g-cm², greater than 3700 g-cm², greater than 3800 g-cm², greater than 3900 g-cm², greater than 4000 g-cm², greater than 4100 g-cm², or greater than 4200 g-cm².

EXAMPLES

Example 1

In one example, the amplitude of a natural frequency at impact of a control multi-material fairway wood-type club head devoid of a tuning element was measured and compared to a plurality of exemplary multi-material fairway wood-type club heads, each comprising a tuning element on the interior surface of the crown. The control club head comprised a hotspot at a natural frequency of 5860 Hz located near the heel of the crown, in the rear-heel quadrant 176. A first exemplary multi-material club head comprised a 1 gram tuning element placed at the location of the control club hotspot (i.e. in the rear-heel quadrant). Similarly, a second exemplary multi-material club head comprised a 1 gram tuning element placed at the location of the control club hotspot. The amplitude of the 5860 Hz natural frequency was compared between the control club head and the first and second exemplary club heads.

TABLE 2

| Vibrational Amplitude Comparison (Heel-Located Tuning Elements) | |
|---|---|
| Club Head | Amplitude at 5860 Hz (Decibels) |
| Control | 67 |
| 1-gram Tuning Element (rear-heel) | 65 |
| 2-gram Tuning Element (rear-heel) | 61 |

As displayed in Table 2, the first and second exemplary club heads each experienced a reduction in amplitude of the control club natural frequency. The first exemplary club head comprised a 2 decibel reduction in amplitude while the second exemplary club head comprised a 6 decibel reduction in amplitude. Stated another way, the first exemplary club head comprised a 20.5% decrease in vibrational energy at the 5860 Hz natural frequency, and the second exemplary club comprised a 50% decrease in vibrational energy at the 5860 Hz natural frequency. The drastic reduction in vibrational energy from the control club head to the first and second exemplary club heads illustrates the first and second exemplary club heads each comprising acoustic responses that are softer and more muted than the acoustic response of the control club.

Additionally, a test was conducted comparing the duration of the vibrational response of the first exemplary club head and the second exemplary club head to the control club head. The total duration, the duration of the sustain phase, and the duration of the release phase of each club head's vibrational response was measured and compared. As discussed above, the total duration refers to the amount of time from impact between the club head and the ball to when the club head stops vibrating. The duration of the sustain phase refers to the amount of time the vibrational response spends within 20% of the peak vibrational amplitude. The duration of the release phase refers to the amount of time from the end of the sustain duration (i.e. from when the vibration dips below 20% of its peak amplitude) to the end of the total vibrational response. In general, vibrational responses with greater durations are perceived as louder than vibrational responses with shorter durations. A longer sustain phase contributes to the response sounding louder for longer, while a longer release phase contributes to a prolonged "ringing" sensation. Table 3 below shows the sustain duration, release duration, and total duration (the sum of sustain duration and release duration) of the time response of each club head vibration.

TABLE 3

Vibrational Time Response Comparison
(Heel-Located Tuning Elements)

| Club Head | Sustain (ms) | Release (ms) | Total (ms) |
|---|---|---|---|
| Control | 9.58 | 27.54 | 37.12 |
| 1-gram tuning element (rear-heel) | 7.85 | 28.98 | 36.83 |
| 2-gram tuning element (rear-heel) | 2.96 | 27.42 | 30.38 |

As displayed in Table 3, the club head comprising the 1-gram tuning element experienced a total vibrational response slightly shorter (0.29 milliseconds shorter) than the control club, while the club head comprising the 2-gram tuning element experienced a total vibrational response 6.74 milliseconds shorter than the control club (18.2% shorter).

Referring to the sustain phases, which contribute most significantly to the overall perception of the sound of each club head, both exemplary club heads displayed significant improvement over the control club. The sustain phase of the club head with the 1-gram tuning element was 1.73 milliseconds shorter than the sustain phase of the control club head (18.1% shorter), while the sustain phase of the club head with the 2-gram tuning element was 6.62 milliseconds shorter than the sustain phase of the control club head (69.1% shorter).

Not only did the inclusion of the tuning element lead to a reduced amplitude of dominant vibrations in the club head, it also significantly shortened the duration of the dominant vibrations. The combination of a reduced amplitude and shorter duration of dominant vibrations produces a club head with a softer and more pleasant acoustic response at impact.

Example 2

In a second example, the amplitude of a natural frequency at impact of a control multi-material fairway wood-type club head without a tuning element was measured and compared to a third exemplary multi-material fairway wood-type club head comprising a tuning element on the interior surface of the crown. The control club head comprised a hotspot at a natural frequency of 6147 Hz located near the toe of the crown, in the rear-toe quadrant. The third exemplary multi-material club head comprised a 2-gram tuning element placed at the location of the control club hotspot (i.e. in the rear-toe quadrant). The amplitude of the 6147 Hz natural frequency was compared between the control club head and the third exemplary club head.

The amplitude of the 6147 Hz hotspot of the control club was 67 decibels, while the amplitude of the 6147 Hz natural frequency of the third exemplary club head was only 62.5 decibels. This 4.5 decibel decrease between the control club and the third exemplary club head equates to a 40.5% reduction in vibrational energy at the 6147 Hz dominant natural frequency. The drastic reduction in vibrational energy from the control club head to the third exemplary club head illustrates the third exemplary club head comprises a softer, more muted, and more pleasing acoustic response than the control club head.

Additionally, a test was conducted comparing the duration of the vibrational response of the third exemplary club head to the control club head. The total duration, the duration of a "sustain" phase, and the duration of the "release" phase of each club head's vibrational response was measured and compared. Table 4 below shows the sustain duration, release duration, and total duration (the sum of sustain duration and release duration) of the time response of each club head vibration.

TABLE 4

Vibrational Time Response Comparison
(Toe-Located Tuning Element)

| Club Head | Sustain (ms) | Release (ms) | Total (ms) |
|---|---|---|---|
| Control | 9.58 | 27.54 | 37.12 |
| 2-gram Tuning Element (rear-toe) | 2.62 | 24.46 | 27.08 |

As displayed in Table 4, the third exemplary club head comprising the 2-gram tuning element in the rear-toe quadrant experienced a total vibrational response 10.04 milliseconds than the control club (27% shorter). Referring to the sustain phase, which contributes most significantly to the overall perception of the sound in the club head, the third exemplary club head displayed significant improvement over the control club. The sustain phase of the club head with the 1-gram tuning element was 6.96 milliseconds shorter than the sustain phase of the control club head (72.7% shorter).

Not only did the inclusion of the tuning element lead to a reduced amplitude of dominant vibrations in the club head, it also significantly shortened the duration of the dominant vibrations. The combination of a reduced amplitude and shorter duration of dominant vibrations produces a club head with a softer and more pleasant acoustic response at impact.

Example 3

The mass properties were compared between a control fairway wood-type club head and the first and second exemplary fairway wood-type golf club heads of Example 1. Specifically, the center of gravity (CG) position and moments of inertia (MOI) of each club were compared to determine the impact of including the tuning element. Table 5 below show the center of gravity position in the Y-direction CGy, measured positively with respect to the ground plane, center of gravity position in the Z-direction, measured negatively rearward from the leading edge, the moment of inertia about the CG x-axis (Ixx) and the moment of inertia about the CG y-axis (Iyy).

TABLE 5

Mass Properties Comparison
(Heel-Located Tuning Elements)

| Club Head | CGy (mm.) | CGz (mm.) | Ixx (g * cm$^2$) | Iyy (g * cm$^2$) |
|---|---|---|---|---|
| Control | −4.39 | −29.31 | 1581 | 2955 |
| 1-gram Tuning Element (rear-heel) | −4.27 | −29.18 | 1567 | 2939 |
| 2-gram Tuning Element (rear-toe) | −4.14 | −29.06 | 1551 | 2920 |

With respect to the Y-direction, the inclusion of the 1-gram tuning element resulted in a raised CG position only 0.12 mm higher than the control club (an increase of only 2.7% with respect to the control club CG height). Similarly, the inclusion of the 2-gram tuning element resulted in a CG position only 0.25 mm higher than the control club (an increase in CG height of only 5.7%).

With respect to the Z-direction, the inclusion of the 2-gram tuning element resulted in a CG position only 0.13 mm more forward than the control club (a decrease of only 0.44% with respect to the control club CG depth). Similarly, the inclusion of the 2-gram tuning element resulted in a CG position only 0.25 mm more forward than the control club (a decrease in CG depth of only 0.85%). Even with the inclusion of the tuning element, the exemplary club heads still retain low-and-back CG positions.

With respect to the club head moment of inertia about the CG x-axis, the inclusion of the 1-gram tuning element resulted in a reduction in Ixx of only 14 g*cm² (a decrease in Ixx of only 0.89% with respect to the control club head). Similarly, the inclusion of the 2-gram tuning element resulted in a reduction in Ixx of only 30 g*cm² (a decrease in Ixx of only 1.9%).

With respect to the club head moment of inertia about the CG y-axis, the inclusion of the 1-gram tuning element resulted in a reduction in Iyy of only 16 g*cm² (a decrease in Iyy of only 0.54% with respect to the control club head). Similarly, the inclusion of the 2-gram tuning element resulted in a reduction in Iyy of only 35 g*cm² (a decrease in Iyy of only 1.18%). Even with the inclusion of the tuning element, the exemplary club heads still retain high moments of inertia.

As illustrated above in Example 1, the inclusion of the 1-gram and 2-gram tuning elements results in drastic improvements to the vibrational response of the club head. The present example illustrates that these vibrational improvements can be achieved by the lightweight tuning element with insignificant effect on the mass properties of the club head. As such, the vibrational response of the club head can be controlled and improved without sacrificing the mass properties that lead to high performance.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Clause 1: A golf club head comprising a crown, a sole opposite the crown, a heel end, a toe end opposite the heel end, a front end comprising a leading edge, a rear end, and a skirt extending between the crown and the sole; a first component formed of a metal and comprising a striking face, a return portion extending rearward from the striking face, and a sole rear extension extending rearward from the return portion; a second component formed of a non-metal and configured to be secured to the first component to enclose a hollow interior cavity, wherein the second component forms a majority of the crown and wraps around the skirt to form at least a portion of the heel end, the toe end, and the sole; wherein the striking face comprises a striking face center defining an origin for a coordinate system including an x-axis extending horizontally through the striking face center in a direction extending from the heel end to the toe end when the club head is at an address position, a y-axis extending vertically through the striking face center in a direction extending from the crown to the sole, wherein the y-axis is perpendicular to the x-axis, a z-axis extending horizontally through the striking face center in a direction extending from the striking face to the rear end, wherein the z-axis is perpendicular to both the x-axis and the y-axis; a front end reference plane tangent to the leading edge and perpendicular to a ground plane, the ground plane being defined as tangent to the sole at the address position; a rear end reference plane tangent to the rear end and parallel to the front end reference plane; a midplane perpendicular to the ground plane and located halfway between the front end reference plane and the rear end reference plane; a YZ plane extending along the y-axis and the z-axis perpendicular to the ground plane; wherein when viewing the club head from a top view, the intersection of the midplane and the YZ plane divide the club head into a quadrant system having a front-toe quadrant, a front-heel quadrant, a rear-toe quadrant, and a rear-heel quadrant; a tuning element secured to an interior surface of the second component within the rear-heel quadrant; wherein the tuning element comprises an adhesive layer, a stiffening layer opposite the adhesive layer, and a damping layer sandwiched between the adhesive layer and the stiffening layer; wherein the stiffening layer comprises a glass cloth; wherein the damping layer comprises a thermoplastic elastomer; wherein the club head comprises a hotspot within the rear-heel quadrant, the hotspot being defined as a location of maximum amplitude of a natural frequency when the club head is devoid of the tuning element; wherein the natural frequency of the club head is between 5000 Hz and 6500 Hz; wherein the tuning element is positioned on the hotspot, the tuning element is configured to damp the maximum amplitude of the natural frequency; and wherein when the club head comprising the tuning element vibrates at the natural frequency, the maximum amplitude is reduced by at least 2 decibels when compared to a similar club head devoid of the tuning element.

Clause 2: The golf club head of clause 1, wherein the tuning element further comprises a tuning element center point located halfway between a heel-most portion of the tuning element and a toe-most portion of the tuning element, and halfway between a forwardmost portion of the tuning element and a rearward-most portion of tuning element; and wherein the tuning element center point is located within the rear-heel quadrant.

Clause 3: The golf club head of clause 2, wherein an offset distance measured parallel to the z-axis and between the front end reference plane and the tuning element center point is between 1.5 inches and 2.0 inches.

Clause 4: The golf club head of clause 1, wherein the second component further comprises a second component crown portion forming at least a portion of the crown of the club head;

Clause 5: The golf club head of clause 1, further comprising a locating feature defining a recessed portion in an exterior surface of the crown, the locating feature comprising an edge separating the recessed portion from an adjacent non-recessed portion of the crown.

Clause 6: The golf club head of clause 5, further comprising an alignment feature protruding from the interior surface of the second component opposite the recessed portion of the crown; wherein the tuning element is secured to the alignment feature.

Clause 7: The golf club head of clause 1, wherein the natural frequency of the golf club head is between 5500 Hz and 6000 Hz.

Clause 8: The golf club head of clause 1, wherein the tuning element is adhesively coupled to the interior surface of the second component.

Clause 9: The golf club head of clause 1, wherein the tuning element comprises a mass between 0.5 grams and 4 grams.

Clause 10: The golf club head of clause 1, further comprising: a club head volume less than 200 cc; wherein the golf club head comprises a center of gravity defining an origin for a coordinate system including a CG x-axis parallel to the ground plane and in a direction from the heel end to the toe end, and a CG y-axis perpendicular to the ground plane and in a direction extending from the sole to the crown when the club head is at the address position; wherein the golf club head comprises a Ixx moment of inertia about the CG x-axis greater than 1500 g*cm²; and wherein the golf club head comprises a Iyy moment of inertia about the CG y-axis greater than 2900 g*cm².

Clause 11: A golf club head comprising: a crown, a sole opposite the crown, a heel end, a toe end opposite the heel end, a front end comprising a leading edge, a rear end, and a skirt extending between the crown and the sole; a first component formed of a metal and comprising a striking face, a return portion extending rearward from the striking face, and a sole rear extension extending rearward from the return portion; a second component formed of a non-metal and configured to be secured to the first component to enclose a hollow interior cavity, wherein the second component forms a majority of the crown and wraps around the skirt to form at least a portion of the heel end, the toe end, and the sole; wherein the striking face comprises a striking face center defining an origin for a coordinate system including an x-axis extending horizontally through the striking face center in a direction extending from the heel end to the toe end when the club head is at an address position, a y-axis extending vertically through the striking face center in a direction extending from the crown to the sole, wherein the y-axis is perpendicular to the x-axis, a z-axis extending horizontally through the striking face center in a direction extending from the striking face to the rear end, wherein the z-axis is perpendicular to both the x-axis and the y-axis; a front end reference plane tangent to the leading edge and perpendicular to a ground plane, the ground plane being defined as tangent to the sole at the address position; a rear end reference plane tangent to the rear end and parallel to the front end reference plane; a midplane perpendicular to the ground plane and located halfway between the front end reference plane and the rear end reference plane; a YZ plane extending along the y-axis and the z-axis perpendicular to the ground plane; wherein when viewing the club head from a top view, the intersection of the midplane and the YZ plane divide the club head into a quadrant system having a front-toe quadrant, a front-heel quadrant, a rear-toe quadrant, and a rear-heel quadrant; a tuning element secured to an interior surface of the second component within the rear-toe quadrant; wherein the tuning element comprises an adhesive layer, a stiffening layer opposite the adhesive layer, and a damping layer sandwiched between the adhesive layer and the stiffening layer; wherein the stiffening layer comprises a glass cloth; wherein the damping layer comprises a thermoplastic elastomer; wherein the club head comprises a hotspot within the rear-heel quadrant, the hotspot being defined as a location of maximum amplitude of a natural frequency when the club head is devoid of the tuning element; wherein the natural frequency of the club head is between 5000 Hz and 6500 Hz; wherein the tuning element is positioned on the hotspot, the tuning element is configured to damp the maximum amplitude of the natural frequency; and wherein when the club head comprising the tuning element vibrates at the natural frequency, the maximum amplitude is reduced by at least 2 decibels when compared to a similar club head devoid of the tuning element.

Clause 12: The golf club head of clause 11, wherein the natural frequency of the golf club head is between 6000 Hz and 6500 Hz.

Clause 13: The golf club head of clause 11, wherein the tuning element further comprises a tuning element center point located halfway between a heel-most portion of the tuning element and a toe-most portion of the tuning element and halfway between a forwardmost portion of the tuning element and a rearward-most portion of tuning element; and wherein the tuning element center point is located within the rear-toe quadrant.

Clause 14: The golf club head of clause 11, further comprising: a club head volume less than 200 cc; wherein the golf club head comprises a center of gravity defining an origin for a coordinate system including a CG x-axis parallel to the ground plane and in a direction from the heel end to the toe end, and a CG y-axis perpendicular to the ground plane and in a direction extending from the sole to the crown when the club head is at the address position; wherein the golf club head comprises a Ixx moment of inertia about the CG x-axis greater than 1500 g*cm²; and wherein the golf club head comprises a Iyy moment of inertia about the CG y-axis greater than 2900 g*cm².

Clause 15: A golf club head comprising a crown, a sole opposite the crown, a heel end, a toe end opposite the heel end, a front end comprising a leading edge, a rear end, and a skirt extending between the crown and the sole; a first component formed of a metal and comprising a striking face, a return portion extending rearward from the striking face, and a sole rear extension extending rearward from the return portion; a second component formed of a non-metal and configured to be secured to the first component to enclose a hollow interior cavity, wherein the second component forms a majority of the crown and wraps around the skirt to form at least a portion of the heel end, the toe end, and the sole; wherein the striking face comprises a striking face center defining an origin for a coordinate system including an x-axis extending horizontally through the striking face center in a direction extending from the heel end to the toe end when the club head is at an address position, a y-axis extending vertically through the striking face center in a direction extending from the crown to the sole, wherein the y-axis is perpendicular to the x-axis, a z-axis extending horizontally through the striking face center in a direction extending from the striking face to the rear end, wherein the z-axis is perpendicular to both the x-axis and the y-axis; a front end reference plane tangent to the leading edge and perpendicular to a ground plane, the ground plane being defined as tangent to the sole at the address position; a rear end reference plane tangent to the rear end and parallel to the front end reference plane; a midplane perpendicular to the ground plane and located halfway between the front end reference plane and the rear end reference plane; a YZ plane extending along the y-axis and the z-axis perpendicular to the ground plane; wherein when viewing the club head from a top view, the intersection of the midplane and the YZ plane divide the club head into a quadrant system having a front-toe quadrant, a front-heel quadrant, a rear-toe quadrant, and a rear-heel quadrant; a tuning element secured to an interior surface of the second component within the rear-heel quadrant; wherein the tuning element comprises an adhesive layer, a stiffening layer opposite the adhesive layer, and a damping layer sandwiched between the adhesive layer and the stiffening layer; wherein the stiffening layer comprises a glass cloth; wherein the damping layer comprises a thermoplastic elastomer; wherein the club head comprises a hotspot within the rear-heel quadrant, the hotspot being defined as a location of maximum amplitude of a natural frequency when the club head is devoid of the tuning element; wherein the natural frequency of the club head is between 5000 Hz and 6500 Hz; wherein the tuning element is positioned on the hotspot, the tuning element is configured to damp the maximum amplitude of the natural frequency; and wherein when the club head comprising the tuning element vibrates at the natural frequency, the maximum amplitude is reduced by at least 2 decibels when compared to a similar club head devoid of the tuning element; wherein the maximum amplitude of the natural frequency is less than or equal to 65 decibels.

Clause 16: The golf club head of clause 15, wherein the natural frequency of the golf club head is between 5500 Hz and 6000 Hz.

Clause 17: The golf club head of clause 15, wherein the tuning element further comprises a tuning element center point located halfway between a heel-most portion of the tuning element and a toe-most portion of the tuning element and halfway between a forwardmost portion of the tuning element and a rearward-most portion of tuning element; and wherein the tuning element center point is located within the rear-heel quadrant.

Clause 18: The golf club head of clause 15, wherein the tuning element comprises a density between 0.5 g/cm³ and 1.5 g/cm³.

Clause 19: The golf club head of clause 15, wherein the stiffening layer comprises a tensile strength greater than 60 MPa.

Clause 20: The golf club head of clause 16, wherein the natural frequency of the golf club head is approximately 5860 Hz.

Various features and advantages of the disclosure are set forth in the following claims.

What is claimed is:

1. A golf club head comprising:
   a crown, a sole opposite the crown, a heel end, a toe end opposite the heel end, a front end comprising a leading edge, a rear end, and a skirt extending between the crown and the sole;
   a first component formed of a metal material and comprising a striking face, a return portion extending rearward from the striking face, and a sole rear extension extending rearward from the return portion;
   a second component formed of a non-metal material and configured to be secured to the first component to enclose a hollow interior cavity, wherein the second component comprises a second component crown portion that forms a majority of the crown;
   a tuning element secured to an interior surface of the second component crown portion;
   wherein the tuning element comprises an adhesive layer, a stiffening layer opposite the adhesive layer, and a damping layer sandwiched between the adhesive layer and the stiffening layer;
   wherein the second component comprises a recess formed in an exterior surface of the crown,
   wherein the recess comprises a recess edge separating the recess from a non-recessed surface of the crown adjacent the recess;
   wherein the recess forms a corresponding protrusion extending into the hollow interior cavity from an internal surface of the crown;
   wherein the club head comprises a hotspot located proximate the recess, the hotspot being defined as a location of maximum amplitude of a natural frequency when the club head is devoid of the tuning element;
   wherein the tuning element is positioned on the protrusion; and
   wherein the tuning element is configured to damp the maximum amplitude of the natural frequency.

2. The golf club head of claim 1, wherein the second component further comprises:
   a second component heel portion wrapping around at least a portion of the heel end; and
   a second component toe portion wrapping around at least a portion of the toe end.

3. The golf club head of claim 1, wherein the tuning element is coupled to the second component via the adhesive layer.

4. The golf club head of claim 1, wherein the maximum amplitude of the natural frequency is reduced by at least 2 decibels when compared to a similar club head that is identical to the golf club head of claim 1, but for the absence of the tuning element.

5. The golf club head of claim 1, wherein the striking face comprises a striking face center defining an origin for a coordinate system including:
   an x-axis extending horizontally through the striking face center in a direction extending from the heel end to the toe end when the club head is at an address position;
   a y-axis extending vertically through the striking face center in a direction extending from the crown to the sole, wherein the y-axis is perpendicular to the x-axis;

a z-axis extending horizontally through the striking face center in a direction extending from the striking face to the rear end, wherein the z-axis is perpendicular to both the x-axis and the y-axis;

a front end reference plane tangent to the leading edge and perpendicular to a ground plane, the ground plane being defined as tangent to the sole at the address position;

a rear end reference plane tangent to the rear end and parallel to the front end reference plane;

a midplane perpendicular to the ground plane and located halfway between the front end reference plane and the rear end reference plane; and a YZ plane extending along the y-axis and the z-axis perpendicular to the ground plane;

wherein when viewing the club head from a top view, an intersection of the midplane and the YZ plane divides the club head into a quadrant system having a front-toe quadrant, a front-heel quadrant, a rear-toe quadrant, and a rear-heel quadrant.

6. The golf club head of claim 5, wherein the tuning element further comprises a tuning element center point located halfway between a heel-most portion of the tuning element and a toe-most portion of the tuning element and halfway between a forwardmost portion of the tuning element and a rearward-most portion of tuning element.

7. The golf club head of claim 6, wherein the tuning element center point is located within the rear-heel quadrant.

8. The golf club head of claim 6, wherein the club head defines offset distance between the front end reference plane and the tuning element center point, measured parallel to the z-axis; wherein the offset distance is between 1.5 inches and 2.0 inches.

9. A golf club head comprising:
a crown, a sole opposite the crown, a heel end, a toe end opposite the heel end, a front end comprising a leading edge, a rear end, and a skirt extending between the crown and the sole;
a first component formed of a metal material and comprising a striking face, a return portion extending rearward from the striking face, and a sole rear extension extending rearward from the return portion;
a second component formed of a non-metal material and configured to be secured to the first component to enclose a hollow interior cavity, wherein the second component comprises a second component crown portion that forms a majority of the crown;
a tuning element secured to an interior surface of the second component crown portion;
wherein the tuning element comprises an adhesive layer, a stiffening layer opposite the adhesive layer, and a damping layer sandwiched between the adhesive layer and the stiffening layer;
wherein the stiffening layer comprises a glass cloth;
wherein the damping layer comprises a thermoplastic elastomer;
wherein the second component comprises a recess formed in an exterior surface of the crown,
wherein the recess comprises a recess edge separating the recess from a non-recessed surface of the crown adjacent the recess;
wherein the recess forms a corresponding protrusion extending into the hollow interior cavity from an internal surface of the crown;
wherein the club head comprises a hotspot located proximate the recess, the hotspot being defined as a location of maximum amplitude of a natural frequency when the club head is devoid of the tuning element;
wherein the tuning element is positioned on the protrusion; and
wherein the tuning element is configured to damp the maximum amplitude of the natural frequency.

10. The golf club head of claim 9, wherein the maximum amplitude of the natural frequency is reduced by at least 2 decibels when compared to a similar club head that is identical to the golf club head of claim 9, but for the absence of the tuning element.

11. The golf club head of claim 9, wherein the tuning element comprises a density between 0.5 $g/cm^3$ and 1.5 $g/cm^3$.

12. The golf club head of claim 9, wherein the tuning element comprises a mass between 0.5 grams and 4 grams.

13. The golf club head of claim 9, wherein the stiffening layer comprises a tensile strength greater than 60 MPa.

14. The golf club head of claim 9, wherein the second component further comprises:
a second component heel portion wrapping around at least a portion of the heel end; and
a second component toe portion wrapping around at least a portion of the toe end.

15. A golf club head comprising:
a crown, a sole opposite the crown, a heel end, a toe end opposite the heel end, a front end comprising a leading edge, a rear end, and a skirt extending between the crown and the sole;
a first component formed of a metal material and comprising a striking face, a return portion extending rearward from the striking face, and a sole rear extension extending rearward from the return portion;
a second component formed of a non-metal material and configured to be secured to the first component to enclose a hollow interior cavity, wherein the second component comprises a second component crown portion that forms a majority of the crown;
a tuning element secured to an interior surface of the second component crown portion;
wherein the tuning element comprises an adhesive layer, a stiffening layer opposite the adhesive layer, and a damping layer sandwiched between the adhesive layer and the stiffening layer;
wherein the second component comprises a recess formed in an exterior surface of the crown,
wherein the recess comprises a recess edge separating the recess from a non-recessed surface of the crown adjacent the recess;
wherein the recess forms a corresponding protrusion extending into the hollow interior cavity from an internal surface of the crown;
wherein the club head comprises a hotspot located proximate the recess, the hotspot being defined as a location of maximum amplitude of a natural frequency when the club head is devoid of the tuning element;
wherein the tuning element is positioned on the protrusion;
wherein the tuning element is configured to damp the maximum amplitude of the natural frequency; and
wherein the natural frequency is between 5000 Hz and 6500 Hz.

16. The golf club head of claim 15, wherein the natural frequency of the golf club head is between 5500 Hz and 6000 Hz.

17. The golf club head of claim 16, wherein the natural frequency of the golf club head is approximately 5860 Hz.

18. The golf club head of claim 15, wherein the natural frequency of the golf club head is between 6000 Hz and 6500 Hz.

19. The golf club head of claim 15, wherein the maximum amplitude of the natural frequency is reduced by at least 2 decibels when compared to a similar club head that is identical to the golf club head of claim 15, but for the absence of the tuning element.

20. The golf club head of claim 15, wherein the second component further comprises:
- a second component heel portion wrapping around at least a portion of the heel end; and
- a second component toe portion wrapping around at least a portion of the toe end.

* * * * *